United States Patent
Balasubramanian et al.

(10) Patent No.: US 11,785,467 B2
(45) Date of Patent: Oct. 10, 2023

(54) DETECTING MISTRUSTED USER EQUIPMENT (UE) IN SIDELINK

(71) Applicant: QUALCOMM Incorporated, San Diego, CA (US)

(72) Inventors: Anantharaman Balasubramanian, San Diego, CA (US); Junyi Li, Fairless Hills, PA (US); Hong Cheng, Basking Ridge, NJ (US); Shuanshuan Wu, San Diego, CA (US); Kapil Gulati, Belle Mead, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 17/511,202

(22) Filed: Oct. 26, 2021

(65) Prior Publication Data

US 2023/0140785 A1 May 4, 2023

(51) Int. Cl.
*H04W 72/12* (2023.01)
*H04W 12/122* (2021.01)
*H04W 72/563* (2023.01)

(52) U.S. Cl.
CPC ....... *H04W 12/122* (2021.01); *H04W 72/563* (2023.01)

(58) Field of Classification Search
CPC .............................. H04W 12/12; H04W 72/56
See application file for complete search history.

(56) References Cited

U.S. PATENT DOCUMENTS

| | | | |
|---|---|---|---|
| 2020/0045674 A1* | 2/2020 | Tseng | H04W 72/04 |
| 2022/0022199 A1* | 1/2022 | Zhao | H04W 72/543 |
| 2022/0022228 A1* | 1/2022 | Wang | H04W 4/46 |

FOREIGN PATENT DOCUMENTS

| | | |
|---|---|---|
| WO | 2021154376 | 8/2021 |
| WO | 2021185960 A1 | 9/2021 |
| WO | 2021207473 A1 | 10/2021 |

OTHER PUBLICATIONS

International Search Report and Written Opinion—PCT/US2022/045089—ISA/EPO—dated Jan. 13, 2023.

(Continued)

*Primary Examiner* — Michael T Vu
(74) *Attorney, Agent, or Firm* — Loza & Loza, LLP

(57) ABSTRACT

Aspects relate to techniques for enabling a UE to detect a potential mistrusted UE that may be sharing inaccurate sidelink assistance information with other UEs. In an aspect, a first UE may receive a plurality of sidelink assistance information from other UEs. The first UE can further identify an amount of the plurality of sidelink resources for which a second UE provides respective inconsistent sidelink assistance information with respect to other UEs. In response to the amount exceeding a mistrust detection threshold, the first UE can transmit a report indicating that the second UE is a potential mistrusted UE to a centralized node. Based on the received reports associated with the second UE, the centralized node can transmit a mistrust indication indicating that the second UE is an actual mistrusted UE with respect to subsequent sidelink assistance information associated with the second UE.

30 Claims, 16 Drawing Sheets

(56) References Cited

OTHER PUBLICATIONS

LG Electronics: "Discussion on Feasibility and Benefits for Mode 2 Enhancement", 3GPP TSG RAN WG1 Meeting #103-e, R1-2007896, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020, 26 Pages, XP051946544, The Whole Document, chapter 2-1 on pp. 2-5, figures 1, 3.

LG Electronics: "Discussion on Resource Allocation for NR Sidelink Mode 2", 3GPP TSG-RAN WG1 #97, R1-1907014, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019, 11 pages, XP051728462, The Whole Document.

\* cited by examiner

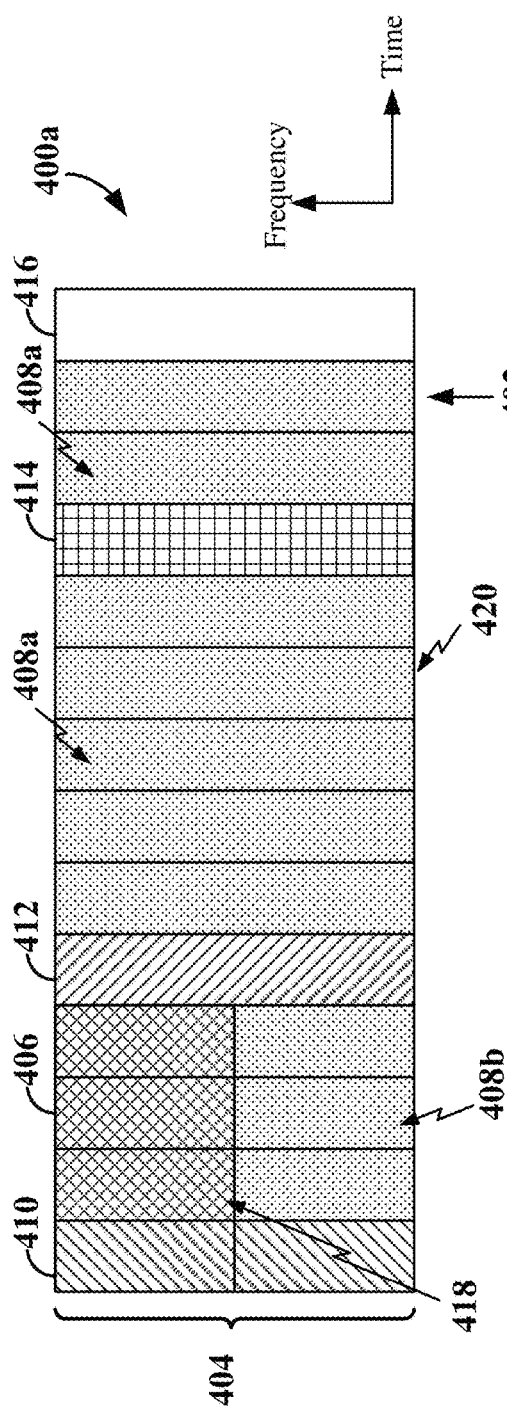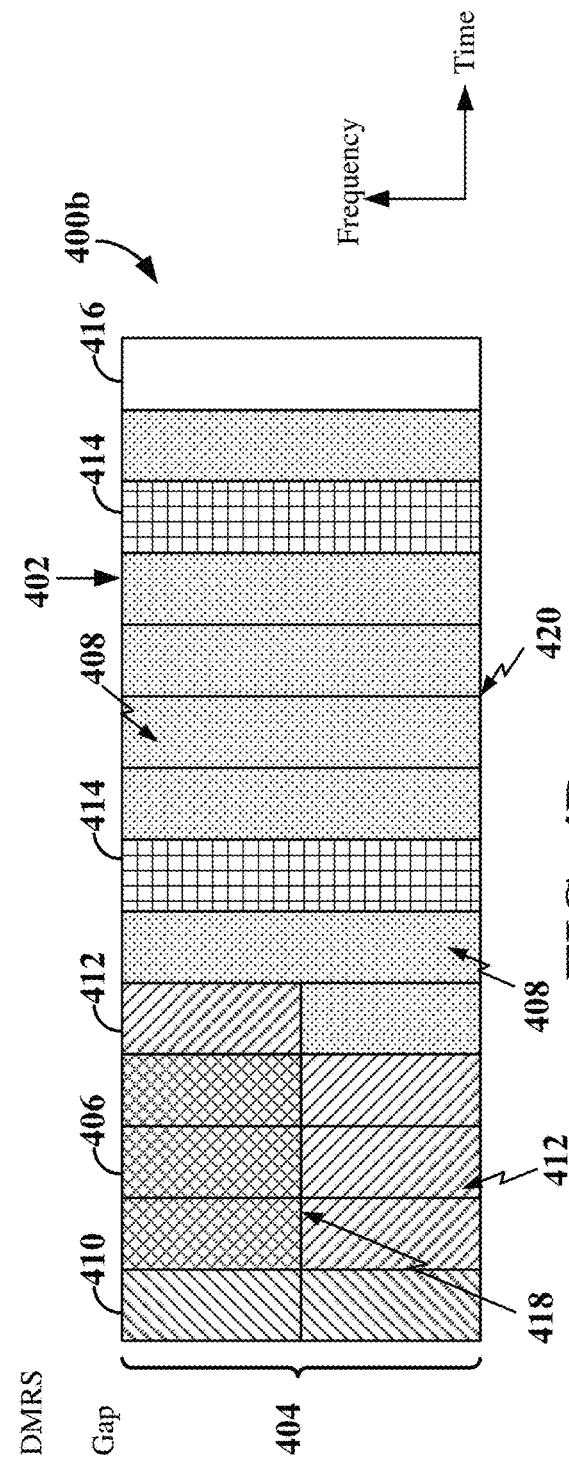
FIG. 4A
FIG. 4B

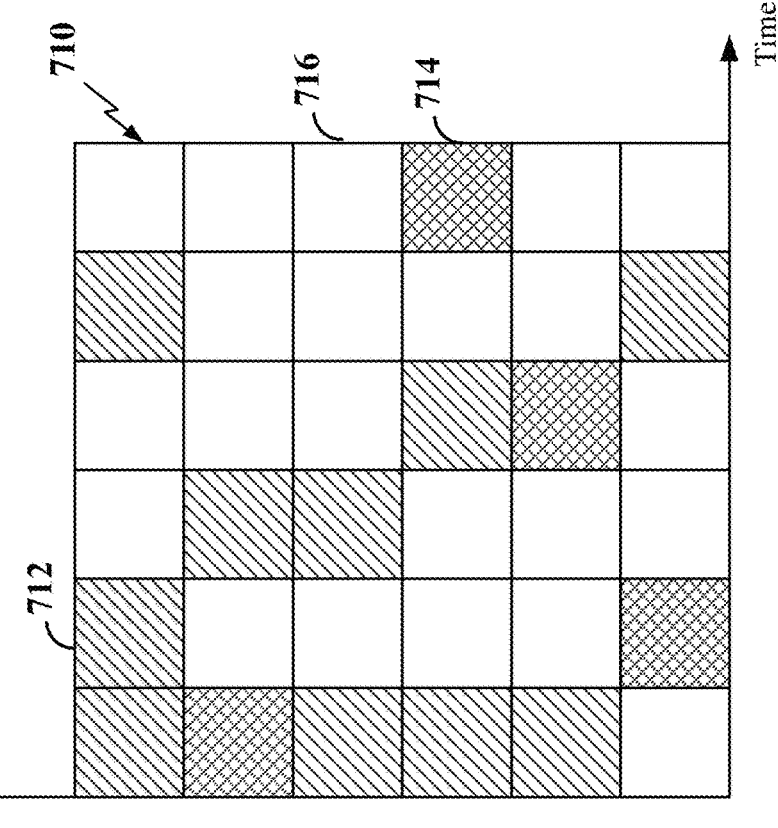
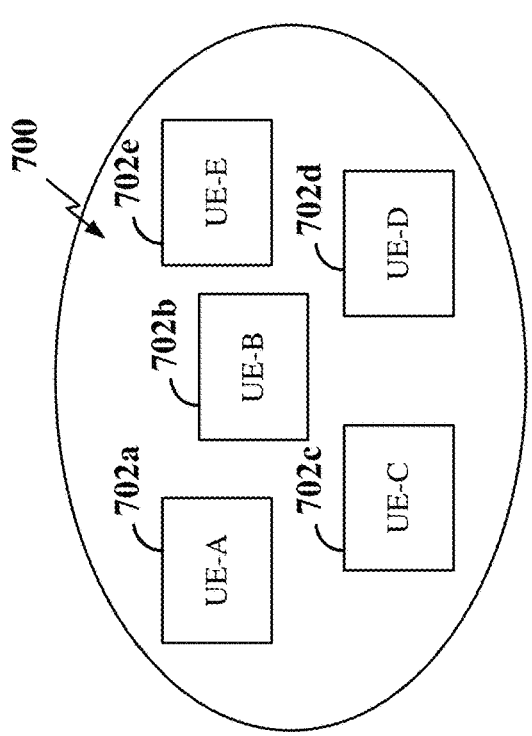
FIG. 7A
FIG. 7B

DETECTING MISTRUSTED USER EQUIPMENT (UE) IN SIDELINK

TECHNICAL FIELD

The technology discussed below relates generally to wireless communication networks, and more particularly, to detecting mistrusted UEs in sidelink.

BACKGROUND

Wireless communication between devices may be facilitated by various network configurations. In one configuration, a cellular network may enable user equipment (UEs) to communicate with one another through signaling with a nearby base station or cell. Another wireless communication network configuration is a device to device (D2D) network in which UEs may signal one another directly, rather than via an intermediary base station or cell. For example, D2D communication networks may utilize sidelink signaling to facilitate the direct communication between UEs over a proximity service (ProSe) PC5 interface. In some sidelink network configurations, UEs may further communicate in a cellular network, generally under the control of a base station. Thus, the UEs may be configured for uplink and downlink signaling via a base station and further for sidelink signaling directly between the UEs without transmissions passing through the base station.

Sidelink communication may be scheduled by the base station or autonomously scheduled (e.g., self-scheduled) by the UEs. In an autonomous or self-scheduling mode, the UEs may sense the sidelink channel to select resources on the sidelink channel that are unoccupied. In addition, UEs may exchange sidelink assistance information, such as inter-UE coordination information, to indicate resources that may be reserved by another UE and/or preferred (or non-preferred) resources for a UE. Inter-UE coordination information may further indicate an expected or detected collision between transmissions on sidelink resources.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a first user equipment (UE) configured for wireless communication is disclosed. The first UE includes a transceiver, a memory, and a processor coupled to the transceiver and the memory. The processor and the memory can be configured to receive a plurality of sidelink assistance information from a plurality of UEs for a plurality of sidelink resources via the transceiver. The processor and the memory can further be configured to transmit, to a centralized node via the transceiver, a report indicating a second UE of the plurality of UEs is a potential mistrusted UE in response to an amount of the plurality of sidelink resources for which the second UE provided respective inconsistent sidelink assistance information with respect to other UEs of the plurality of UEs exceeding a mistrust detection threshold.

Another example provides a method for wireless communication at a first user equipment (UE). The method can include receiving a plurality of sidelink assistance information from a plurality of UEs for a plurality of sidelink resources, and transmitting, to a centralized node, a report indicating a second UE of the plurality of UEs is a potential mistrusted UE in response to an amount of the plurality of sidelink resources for which the second UE provided respective inconsistent sidelink assistance information with respect to other UEs of the plurality of UEs exceeding a mistrust detection threshold.

Another example provides a centralized node configured for wireless communication. The centralized node includes a transceiver, a memory, and a processor coupled to the transceiver and the memory. The processor and the memory can be configured to transmit, to a plurality of user equipment (UEs) via the transceiver, a mistrust detection threshold for detecting potential mistrusted UEs of the plurality of UEs that provide inconsistent sidelink assistance information for one or more sidelink resources with respect to other UEs of the plurality of UEs. The processor and the memory can further be configured to receive, via the transceiver, at least one report from at least a first UE of the plurality of UEs indicating a second UE of the plurality of UEs is a potential mistrusted UE based on the mistrust detection threshold, and transmit, to the plurality of UEs via the transceiver, a mistrust indication indicating that the second UE is an actual mistrusted UE with respect to subsequent sidelink assistance information associated with the second UE.

Another example provides a method for wireless communication at a centralized node configured for wireless communication. The method includes transmitting, to a plurality of user equipment (UEs), a mistrust detection threshold for detecting potential mistrusted UEs of the plurality of UEs that provide inconsistent sidelink assistance information for one or more sidelink resources with respect to other UEs of the plurality of UEs. The method further includes receiving at least one report from at least a first UE of the plurality of UEs indicating a second UE of the plurality of UEs is a potential mistrusted UE based on the mistrust detection threshold, and transmitting, to the plurality of UEs, a mistrust indication indicating that the second UE is an actual mistrusted UE with respect to subsequent sidelink assistance information associated with the second UE.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

BRIEF DESCRIPTION OF THE DRAWINGS

FIGS. 4A and 4B are diagrams illustrating examples of sidelink slot structures according to some aspects.

FIGS. 7A and 7B are diagrams illustrating exemplary sidelink resources for which a plurality of UEs provide sidelink assistance information according to some aspects.

DETAILED DESCRIPTION

Figure 1:
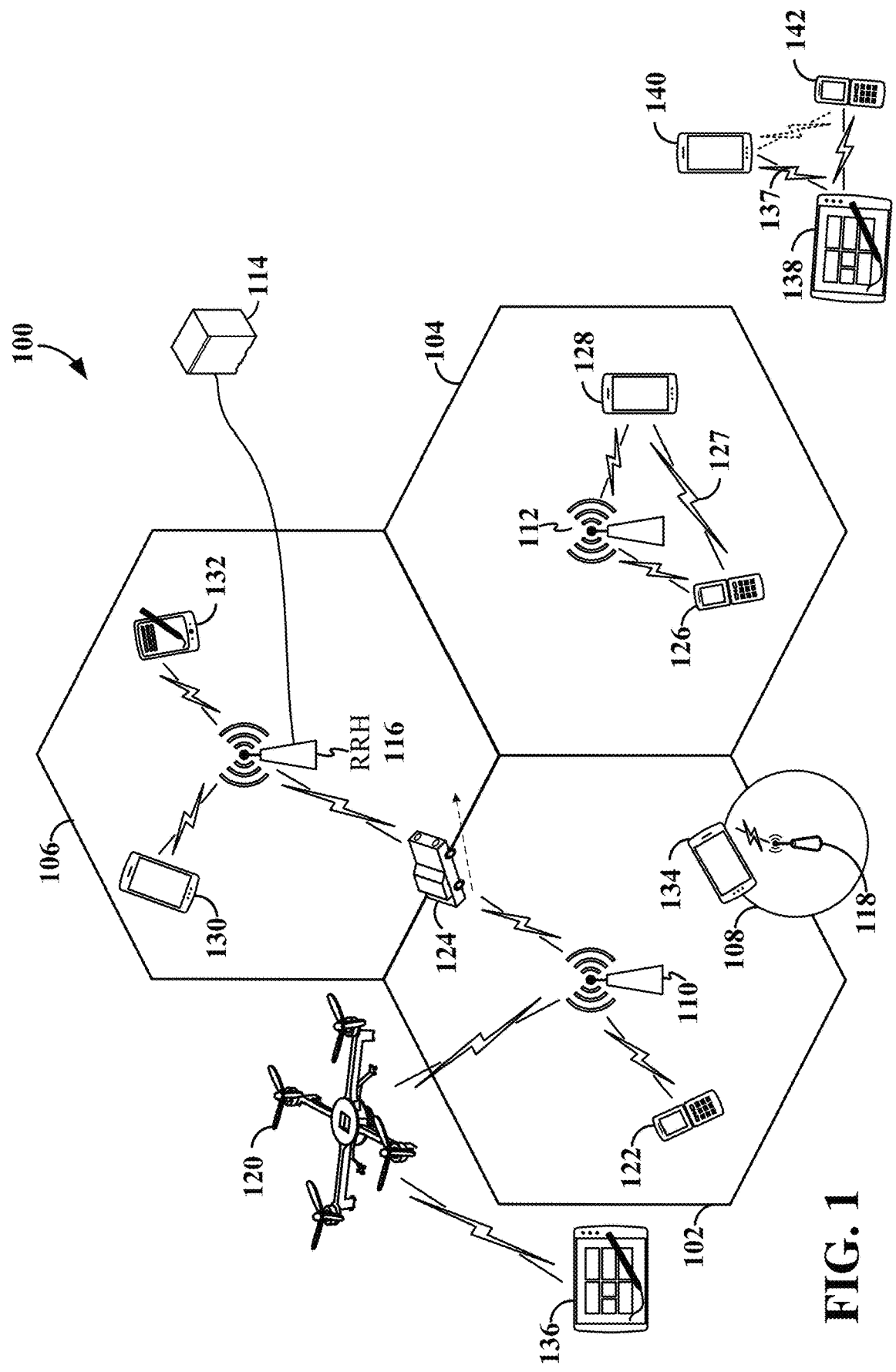
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

With the increase in diverse applications expected to be supported by 3$^{rd}$ Generation Partnership Project (3GPP) New Radio (NR), often referred to as 5G, and subsequent generations (e.g., 6G), the security of wireless communications is at the forefront of 5G/6G communication designs. Security can be enabled at different levels in the 5G protocol stack (e.g., physical (PHY) layer, medium access control (MAC) layer, radio link control (RLC) layer, packet data convergence protocol (PDCP) layer, radio resource control (RRC) layer, application (APP) layer, etc.). Various PHY layer security mechanisms have been developed in cellular (Uu) communications. For example, the downlink control channel can be secured with a cell radio network temporary identifier (C-RNTI) of a UE, the paging channel can be secured with a paging RNTI (P-RNTI), and the random access channel can be secured with the random access RNTI (RA-RNTI). Ciphering (integrity) algorithms, such as SNOW 3G, AES-CTR, and ZUE, may further be utilized in 5G Uu communications.

For sidelink applications, guidelines may be developed for ensuring the validity of information transmitted between UEs. For example, UEs that operate in a self-scheduling mode may rely on sidelink assistance information, such as inter-UE coordination information, to reserve resources for sidelink communication. If the sidelink assistance information provided by one of the UEs is not reliable, this may result in underutilization of sidelink resources and delays in sidelink transmissions. For example, the inter-UE coordination information may indicate that various sidelink resources are already reserved by other UEs. In some cases, a UE may behave in a selfish manner by performing more future reservations than is necessary or otherwise misguiding other UEs by providing incorrect resource reservation information.

Various aspects of the disclosure are related to techniques for enabling a UE to detect a potential mistrusted UE that may be sharing incorrect or inaccurate sidelink assistance information with other UEs. In an aspect, a first UE may receive a plurality of sidelink assistance information (e.g., inter-UE coordination information) from other UEs. The sidelink assistance information may include, for example, information related to a plurality of sidelink resources (e.g., time-frequency resources). Each sidelink resource may correspond to a minimum resource allocation unit in sidelink. For example, the minimum resource allocation unit may include one sub-channel in the frequency domain and one slot in the time domain. In some examples, the inter-UE coordination information may indicate whether one or more of the sidelink resources are reserved for use by another UE or preferred for use for sidelink communication between UEs. The inter-UE coordination information may further indicate an expected or detected collision on one or more of the sidelink resources.

In some examples, the first UE may further receive a protocol identifier identifying a selected mistrust protocol of a plurality of mistrust protocols for detecting potential mistrusted UEs from a centralized node. For example, the centralized node may be a road side unit (RSU) or a base station. In this example, the first UE may utilize the selected mistrust protocol in detecting potential mistrusted UEs.

In one example of a mistrust protocol, the first UE can identify an amount of the plurality of sidelink resources for which a second UE provides respective inconsistent sidelink assistance information with respect to other UEs. For example, the first UE can identify a portion of the plurality of sidelink resources for which the second UE provided sidelink assistance information. The first UE can then identify an amount of the portion of the plurality of sidelink resources for which the second UE provided inconsistent sidelink assistance information with respect to other UEs. For example, the second UE may indicate that a particular sidelink resource is reserved, while other UEs may indicate that the particular sidelink resource is preferred (e.g., not reserved).

The first UE can then compare the amount of sidelink resources for which the second UE provided inconsistent sidelink assistance information to a mistrust detection threshold to determine whether the second UE is a potential mistrusted UE. For example, the first UE can detect that the second UE is a potential mistrusted UE in response to the amount exceeding the mistrust detection threshold. The first UE can then transmit a report indicating that the second UE is a potential mistrusted UE to the centralized node.

In some examples, the mistrust detection threshold may be pre-configured on the first UE (e.g., by the original equipment manufacturer (OEM) based on, for example, one or more standards or specifications). In other examples, the mistrust detection threshold may be received by the first UE from the centralized node. In some examples, the mistrust detection threshold is a UE-specific mistrust detection threshold. In this example, the centralized node may provide a respective UE-specific mistrust detection threshold for each of the UEs within a geographical zone. In other examples, the mistrust detection threshold is an agnostic mistrust detection threshold applicable to all UEs within a geographic zone.

In some examples, the mistrust detection threshold is a percentage of mistrusted sidelink resources (e.g., a mistrusted resource percentage). In this example, the centralized node may further provide a respective weight to be applied to each of the plurality of resources, and the first UE may determine the amount of sidelink resources for which the second UE provided inconsistent sidelink assistance information based on the respective weights. Here, the amount may correspond to a weighted inconsistent resource percentage based on the respective weights applied to each of the sidelink resources. The first UE may detect that the second UE is a potential mistrusted UE in response to the weighted inconsistent resource percentage exceeding the mistrusted resource percentage. In other examples, the mistrust detection threshold is a number of mistrusted sidelink resources (e.g., a mistrusted resource number). In this example, the amount may correspond to a number of inconsistent sidelink resources. The first UE may detect that the second UE is a potential mistrusted UE in response to the number of inconsistent sidelink resources exceeding the mistrusted resource number.

In another example of a mistrust protocol, which may be used together with the mistrust detection threshold protocol described above, the first UE may consider the sidelink assistance information that includes resource reservations indicating that one or more sidelink resources are reserved. In this example, each of these sidelink assistance information can further include an accountability trail identifying a reserving UE that reserved the one or more sidelink resources. For a given sidelink assistance information in which the reserving UE is the second UE (e.g., as indicated by the second UE or as indicated in the accountability trail provided by a third UE), the first UE may determine whether a sidelink transmission by the second UE occurred on the one or more sidelink resources. In examples in which the second UE does transmit on the one or more sidelink resources, the first UE may transmit an additional report to the centralized node including a used resource flag indicating that the sidelink transmission by the second UE occurred. In examples in which the second UE does not transmit on the one or more sidelink resources, the first UE may include an unused resource flag indicating that the second UE failed to transmit the sidelink transmission within the additional report sent to the centralized node.

Based on one or more reports sent by the first UE and other UEs, the centralized node may determine whether the second UE is an actual mistrusted UE. For example, the centralized node may determine that the second UE is an actual mistrusted UE in response to an amount (e.g., number) of received reports for the second UE exceeding a report threshold. The centralized node may further take into account whether the reports include used resource flags indicating that the second UE transmitted on reserved resources or unused resource flags indicating that the second UE failed to transmit on reserved resources. For example, the centralized node may exclude reports indicating that the second UE transmitted on the reserved resources from the amount of reports compared with the report threshold or may utilize an algorithm based on the content of the reports in determining whether the second UE is an actual mistrusted UE.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
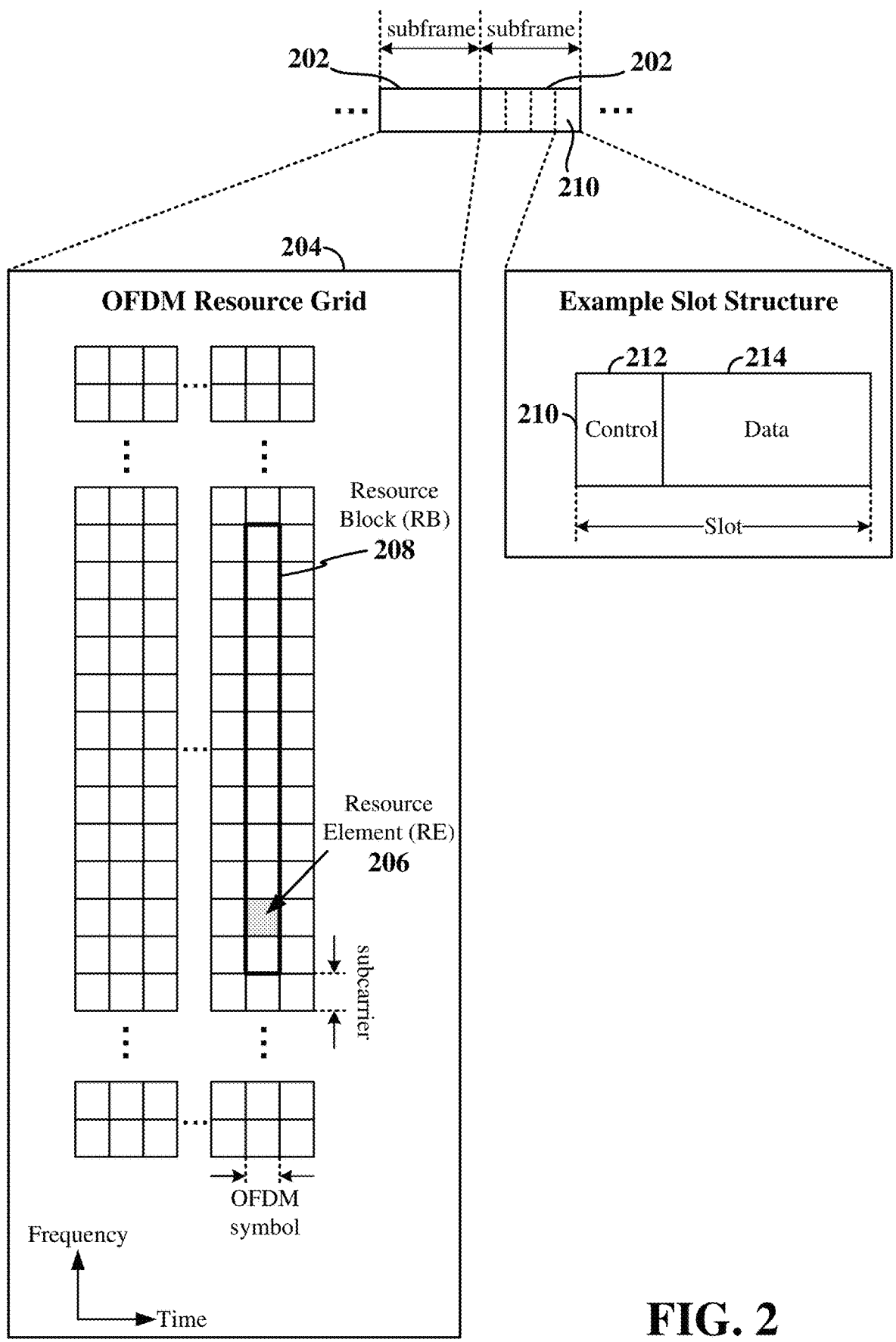
FIG. 2 is a diagram illustrating an example of a frame structure for use in a wireless communication network according to some aspects.

Referring now to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 20, 80, or 120 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, a sidelink DMRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
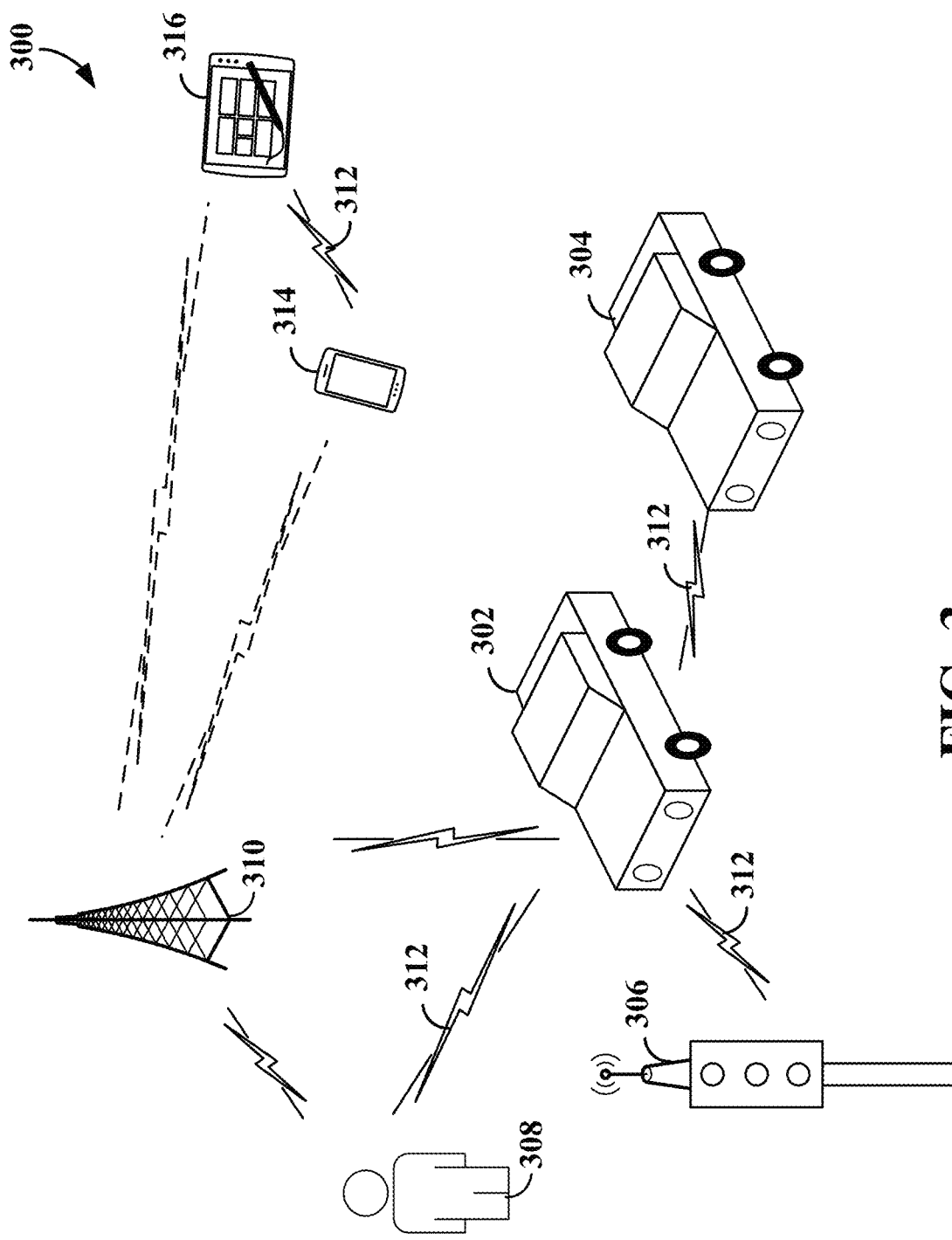
FIG. 3 is a diagram illustrating an example of a wireless communication network employing sidelink communication according to some aspects.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include smart wearables, public safety, or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. The number of sub-channels in a resource pool may include between one and twenty-seven sub-channels. A radio resource control (RRC) configuration of the resource pools may be either pre-configured (e.g., a factory setting on the UE determined, for example, by sidelink standards or specifications) or configured by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. For example, the base station 310 may schedule the sidelink communication via DCI 3_0. In some examples, the base station 310 may schedule the PSCCH/PSSCH within uplink resources indicated in DCI 3_0. The base station 310 may further activate preconfigured sidelink grants (e.g., configured grants) for sidelink communication among the sidelink devices. In some examples, the base station 310 may activate a configured grant (CG) via RRC signaling. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). For example, SCI-1 may include a physical sidelink shared channel (PSSCH) resource assignment and a resource reservation period (if enabled). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may also be transmitted on the PSCCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

In some examples, the SCI (e.g., SCI-1 and/or SCI-2) may further include a resource assignment of retransmission resources reserved for one or more retransmissions of the sidelink transmission (e.g., the sidelink traffic/data). Thus, the SCI may include a respective PSSCH resource reservation and assignment for one or more retransmissions of the PSSCH. For example, the SCI may include a reservation message indicating the PSSCH resource reservation for the initial sidelink transmission (initial PSSCH) and one or more additional PSSCH resource reservations for one or more retransmissions of the PSSCH.

FIGS. 4A and 4B are diagrams illustrating examples of sidelink slot structures according to some aspects. The sidelink slot structures may be utilized, for example, in a V2X or other D2D network implementing sidelink. In the examples shown in FIGS. 4A and 4B, time is in the horizontal direction with units of symbols 402 (e.g., OFDM symbols); and frequency is in the vertical direction. Here, a carrier bandwidth 404 allocated for sidelink wireless communication is illustrated along the frequency axis. The carrier bandwidth 404 may include a plurality of sub-channels, where each sub-channel may include a configurable number of PRBs (e.g., 10, 15, 20, 25, 50, 75, or 100 PRBs).

Each of FIGS. 4A and 4B illustrate an example of a respective slot 400a or 400b including fourteen symbols 402 that may be used for sidelink communication. However, it should be understood that sidelink communication can be configured to occupy fewer than fourteen symbols in a slot 400a or 400b, and the disclosure is not limited to any particular number of symbols 402. Each sidelink slot 400a and 400b includes a physical sidelink control channel (PSCCH) 406 occupying a control region 418 of the slot 400a and 400b and a physical sidelink shared channel (PSSCH) 408 occupying a data region 420 of the slot 400a and 400b. The PSCCH 406 and PSSCH 408 are each transmitted on one or more symbols 402 of the slot 400a. The PSCCH 406 includes, for example, SCI-1 that schedules transmission of data traffic on time-frequency resources of the corresponding PSSCH 408. As shown in FIGS. 4A and 4B, the PSCCH 406 and corresponding PSSCH 408 are transmitted in the same slot 400a and 400b. In other examples, the PSCCH 406 may schedule a PSSCH in a subsequent slot.

In some examples, the PSCCH 406 duration is configured to be two or three symbols. In addition, the PSCCH 406 may be configured to span a configurable number of PRBs, limited to a single sub-channel. The PSSCH resource size may be fixed for a resource pool (e.g., 10% to 100% of one sub-channel in the first two or three symbols). For example, the PSCCH 406 may occupy 10, 12, 15, 20, or 25 RBs of a single sub-channel. In each of the examples shown in FIGS. 4A and 4B, the starting symbol for the PSCCH 406 is the second symbol of the corresponding slot 400*a* or 400*b* and the PSCCH 406 spans three symbols 402. The PSCCH 406 may further include DMRSs.

The PSSCH 408 may be time-division multiplexed (TDMed) with the PSCCH 406 and/or frequency-division multiplexed (FDMed) with the PSCCH 406. In the example shown in FIG. 4A, the PSSCH 408 includes a first portion 408*a* that is TDMed with the PSCCH 406 and a second portion 408*b* that is FDMed with the PSCCH 406. In the example shown in FIG. 4B, the PSSCH 408 is TDMed with the PSCCH 406.

One and two layer transmissions of the PSSCH 408 may be supported with various modulation orders (e.g., QPSK, 16-QAM, 64-QAM and 246-QAM). In addition, the PSSCH 408 may include DMRSs 414 configured in a two, three, or four symbol DMRS pattern. For example, slot 400*a* shown in FIG. 4A illustrates a two symbol DMRS pattern, while slot 400*b* shown in FIG. 4B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 408 symbols in the slot 400*a* or 400*b*. In some examples, the DMRSs 414 may be based on a Gold sequence and a configuration type 1 may be used for the frequency domain pattern of the PSSCH DMRSs 414. In addition, a gap symbol 416 is present after the PSSCH 408 in each slot 400*a* and 400*b*.

Each slot 400*a* and 400*b* further includes SCI-2 412 mapped to contiguous RBs in the PSSCH 408 starting from the first symbol containing a PSSCH DMRS. In the example shown in FIG. 4A, the first symbol containing a PSSCH DMRS is the fifth symbol occurring immediately after the last symbol carrying the PSCCH 406. Therefore, the SCI-2 412 is mapped to RBs within the fifth symbol. In the example shown in FIG. 4B, the first symbol containing a PSSCH DMRS is the second symbol, which also includes the PSCCH 406. In addition, the SCI-2/PSSCH DMRS 412 are shown spanning symbols two through five. As a result, the SCI-2/PSSCH DMRS 412 may be FDMed with the PSCCH 406 in symbols two through four and TDMed with the PSCCH 406 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 406 may be blind decoded at the receiving wireless communication device. However, since the format, starting location, and number of REs of the SCI-2 412 may be derived from the SCI-1, blind decoding of SCI-2 is not needed at the receiver (receiving UE).

In each of FIGS. 4A and 4B, the second symbol of each slot 400*a* and 400*b* is copied onto (repeated on) a first symbol 410 thereof for automatic gain control (AGC) settling. For example, in FIG. 4A, the second symbol containing the PSCCH 406 FDMed with the PSSCH 408*b* may be transmitted on both the first symbol and the second symbol. In the example shown in FIG. 4B, the second symbol containing the PSCCH 406 FDMed with the SCI-2/PSSCH DMRS 412 may be transmitted on both the first symbol and the second symbol.

As mentioned, in Mode 2, two or more UEs may operate autonomously and schedule communications between themselves without base station (e.g., network access node, eNB, gNB) coordination. Mode 2 is an example of, and may be referred to herein as, a self-scheduling mode. In half-duplex communication, the frequencies utilized for transmission and reception are the same. Therefore, a UE may be constrained from transmitting and receiving at the same time. This constraint is referred to herein as a half-duplex (HD) constraint. Because of the HD constraint, a first UE may transmit at a first time and receive at a second time. To facilitate scheduling between UEs with a half-duplex constraint, inter-UE coordination may be practiced by two or more UEs operating in a self-scheduling mode (e.g., Mode 2).

Figure 5:
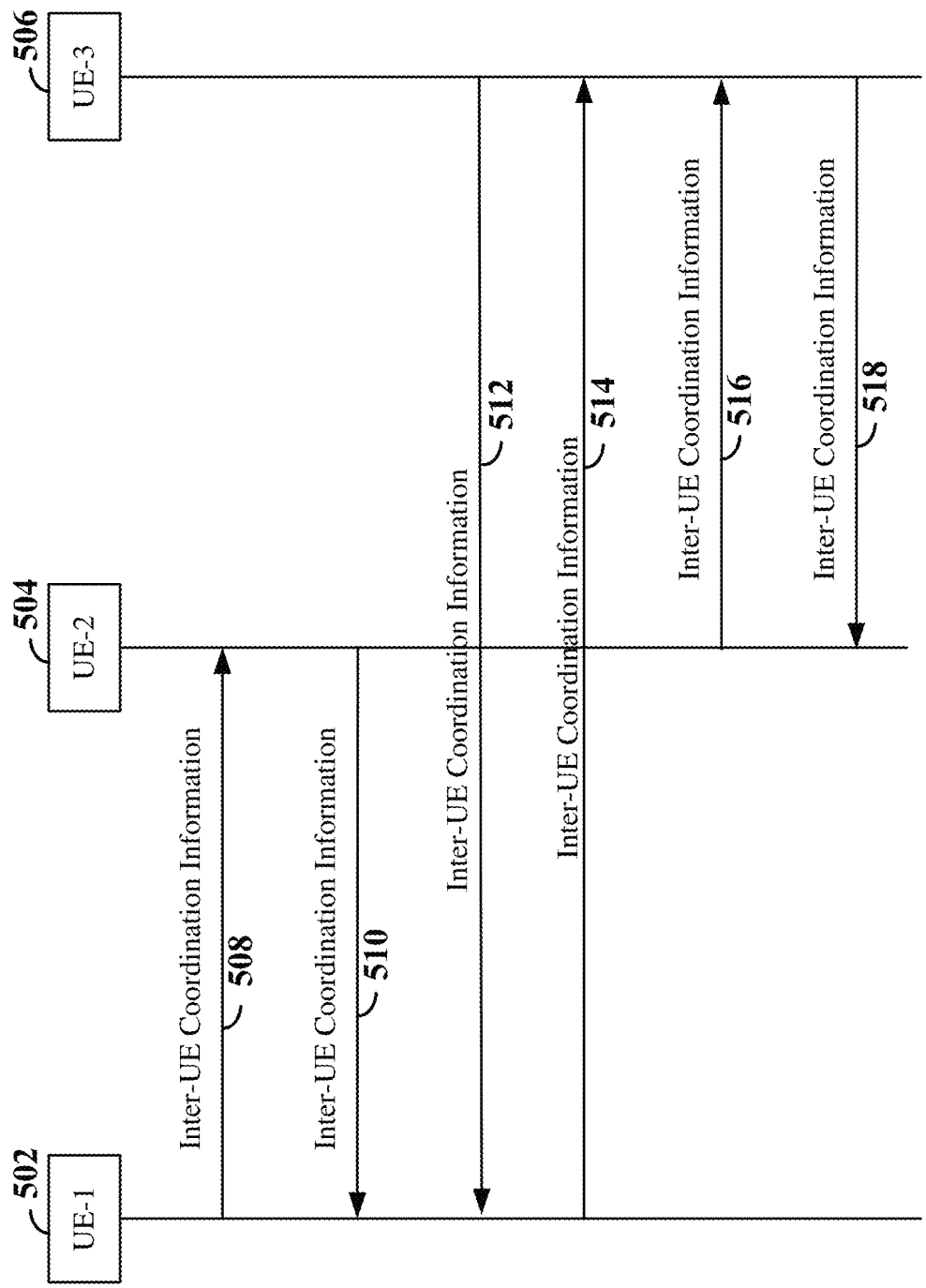
FIG. 5 is a signaling diagram illustrating an exemplary exchange of inter-UE coordination information according to some aspects.

FIG. 5 is a signaling diagram illustrating an exemplary exchange of inter-UE coordination information according to some aspects. As shown in FIG. 5, inter-UE coordination information may be exchanged, for example, between UEs (e.g., UE-1 502, UE-2 504, and UE-3 506). Each of the UEs 502, 504, and 506 may receive and consider the inter-UE coordination information from other UEs that are within the vicinity of the UE, which may be defined as those UEs within a threshold distance from the receiving UE or those UEs for which the reference signal received power (RSRP) of signals received at the receiving UE is above a threshold RSRP.

In some examples, each of UE-1 502, UE-2 504, and UE-3 506 are within the vicinity of one another. Therefore, at 508 and 510, UE-1 502 and UE-2 504 may exchange inter-UE coordination information. In addition, at 512 and 514, UE-1 502 and UE-3 506 may exchange inter-UE coordination information. Similarly, at 516 and 518, UE-2 504 and UE-3 506 may exchange inter-UE coordination information. The inter-UE coordination information may be transmitted, for example, within SCI-2 or sidelink MAC-CE of a PSSCH or via sidelink RRC messaging.

The inter-UE coordination information provided by the different UEs 502, 504, and 506 may provide information on different sets of sidelink resources (e.g., time-frequency resources). In some examples, each sidelink resource may correspond to a minimum resource allocation unit in sidelink (e.g., one sub-channel in the frequency domain and one slot in the time domain) Other units of sidelink resources in time and/or frequency may also be possible, and the present disclosure is not limited to any particular sidelink resource units.

Each inter-UE coordination information (e.g., transmitted at 508-518) may indicate whether one or more sidelink resources are, for example, reserved resources and/or preferred resources. Reserved resources may be associated with respective PSSCH resource assignments identified in respective SCI-1s transmitted between UEs (e.g., in unicast or groupcast sidelink communication). Preferred resources may be associated with respective resources identified in respective SCI-2s transmitted by the UEs.

As an example, the inter-UE coordination information transmitted at 508 by UE-1 502 to UE-2 504 may include an indication of UE-1s reserved resource(s) reserved by UE-1 502 for sidelink communication. The inter-UE coordination information may further include an indication of UE-3s reserved resource(s) reserved by UE-3 506 for sidelink communication. In some examples, UE-2 504 may not receive the SCI-1 of the UE-3 506 (e.g., due to the UE-3 being out of range of the UE-2 at the time the SCI-1 was transmitted). Therefore, the UE-1 502 can include the resource reservation made by the UE-3 506 in the inter-UE coordination information received by the UE-2 504 at 508 to assist the UE-2 504 in reserving resources for sidelink transmissions. For example, by including reserved resource(s) in the inter-UE coordination information, the UE-2 504 may avoid reserving overlapping resources that may interfere with previously scheduled sidelink transmissions by other UEs.

The inter-UE coordination information transmitted at 508 from UE-1 502 to UE-2 504 may further (or alternatively) include the UE-1's indication of a preferred resource (e.g., time-frequency resource, such as one or more sub-channels in one or more slots) for the UE-2's future transmission (to the UE-1) and/or the UE-1's indication of a non-preferred resource for the UE-2's future transmission. The UE-2 504 may accept or not accept the indication to use the preferred resource. If the UE-2 504 accepts the indication to use the preferred resource, the UE-2 504 may allocate the preferred resource to itself and/or may reserve the allocation of the preferred resource for itself. Similarly, the indication of a non-preferred resource may not be a prohibition of use of the non-preferred resource. The UE-2 504 may accept or not accept the indication of the non-preferred resource. If the UE-2 504 accepts the indication of the non-preferred resource, then the UE-2 504 may avoid allocating the non-preferred resource to itself and/or may avoid reserving the allocation of the non-preferred resource for itself. For ease of explanation, it will be understood that a reference herein to a resource in the singular encompasses resources in the plural and a reference herein to resources in the plural encompass a resource in the singular.

In some examples, the preferred resources may be indicated based on the UE-1's knowledge of a planned communication with the UE-3 506 in a time preceding the time occupied by the preferred resources. The non-preferred resources may be indicated based on the UE-1's knowledge that the non-preferred resources are already self-allocated to the UE-1 502 for communication with another UE (not UE-2 504). The inter-UE coordination information transmitted at 508 may further include other information (e.g., information in addition to preferred and/or non-preferred resources and/or reserved resources) that may be used to coordinate communications between the UE-1 502 and the UE-2 504. For example, the inter-UE coordination information may further indicate an expected or detected collision between reserved resources.

Since there is no base station scheduling the sidelink resources used by the UEs operating in the self-scheduling mode in half-duplex, there is a possibility that a transmission by the UE-2 504 will conflict with or collide with a transmission by the UE-3 506. In this case, if the two UEs operate in half-duplex mode and transmit in the same slot, neither will hear each other and neither will know of the conflict or collision between their transmissions. Furthermore, if their transmissions carried indications of respective future (e.g., prospective) reserved resources and/or preferred resources, and those respective future reserved resources and/or preferred resources will conflict or collide with each other, then again because the two UEs would not be able to hear each other, neither will know of the respective future conflict or collision between their indicated or planned uses of reserved resources and/or preferred resources. The respective transmitting UEs may therefore be unaware of actual and/or prospective conflicts or collisions.

Therefore, the UE-1 502 may monitor reservations of reserved resources and/or inter-UE coordination information including indications of preferred resources and/or non-preferred resources, sent from the UE-2 504 and/or the UE-3 506. The UE-1 502 may include a collision indication to the UE-2 504 and/or the UE-3 506 within inter-UE coordination information if the UE-1 502 determines that use of the respective reserved resources and/or the respective preferred resources may result in a collision. The collision indication may be, for example an indication that a collision will occur (e.g., a pre-collision or expected collision indication) or that a collision has occurred (e.g., a post-collision or detected collision indication). The preceding examples of inter-UE coordination information are for illustration and are not intended to limit the scope of the application.

If the inter-UE coordination information provided by one of the UEs is not reliable, this may result in underutilization of sidelink resources and delays in sidelink transmissions. In some cases, a UE may behave in a selfish manner by performing more future reservations than is necessary or otherwise misguiding other UEs by providing incorrect resource reservation information.

In various aspects of the disclosure, a UE can be configured to detect a potential mistrusted UE that may be sharing inaccurate sidelink assistance information with other UEs. In an aspect, a first UE may receive a plurality of sidelink assistance information from other UEs. The sidelink assistance information may include, for example, inter-UE coordination information related to a plurality of sidelink resources. The first UE may further receive a protocol identifier identifying a selected mistrust protocol of a plurality of mistrust protocols for detecting potential mistrusted UEs from a centralized node, such as an RSU or a base station (e.g., gNB). In some examples, based on the selected mistrust protocol, the first UE may further receive a mistrust detection threshold from the centralized node. The mistrust detection threshold may be a UE-specific mistrust detection threshold or an agnostic mistrust detection threshold applicable to all UEs. In some examples, the mistrust detection threshold may be pre-configured on the first UE instead of provided by the centralized node.

The first UE can further identify an amount of the plurality of sidelink resources for which a second UE provides respective inconsistent sidelink assistance information with respect to other UEs. In response to the amount exceeding the mistrust detection threshold, the first UE can transmit a report indicating that the second UE is a potential mistrusted UE to the centralized node. In some examples, based on the selected mistrust protocol, the centralized node may further receive additional reports from the first UE and/or other UEs including an indication of whether the second UE transmitted a sidelink transmission on reserved resources (e.g., resources reserved by the second UE for the sidelink transmission).

Based on the received reports associated with the second UE, the centralized node can transmit a mistrust indication indicating that the second UE is an actual mistrusted UE with respect to subsequent sidelink assistance information associated with the second UE. For example, the centralized node may determine that the second UE is an actual mistrusted UE in response to an amount (e.g., number) of received reports for the second UE exceeding a report threshold. The centralized node may further take into account whether the reports indicate that the second UE transmitted on reserved resources or failed to transmit on reserved resources. In some examples, the mistrust indication may include a cease transmission indication instructing the second UE to cease transmitting sidelink assistance information (e.g., inter-UE coordination information). By detecting mistrusted UEs, the sidelink resource usage may be maximized, while also minimizing potential collisions between sidelink transmissions.

Figure 6:
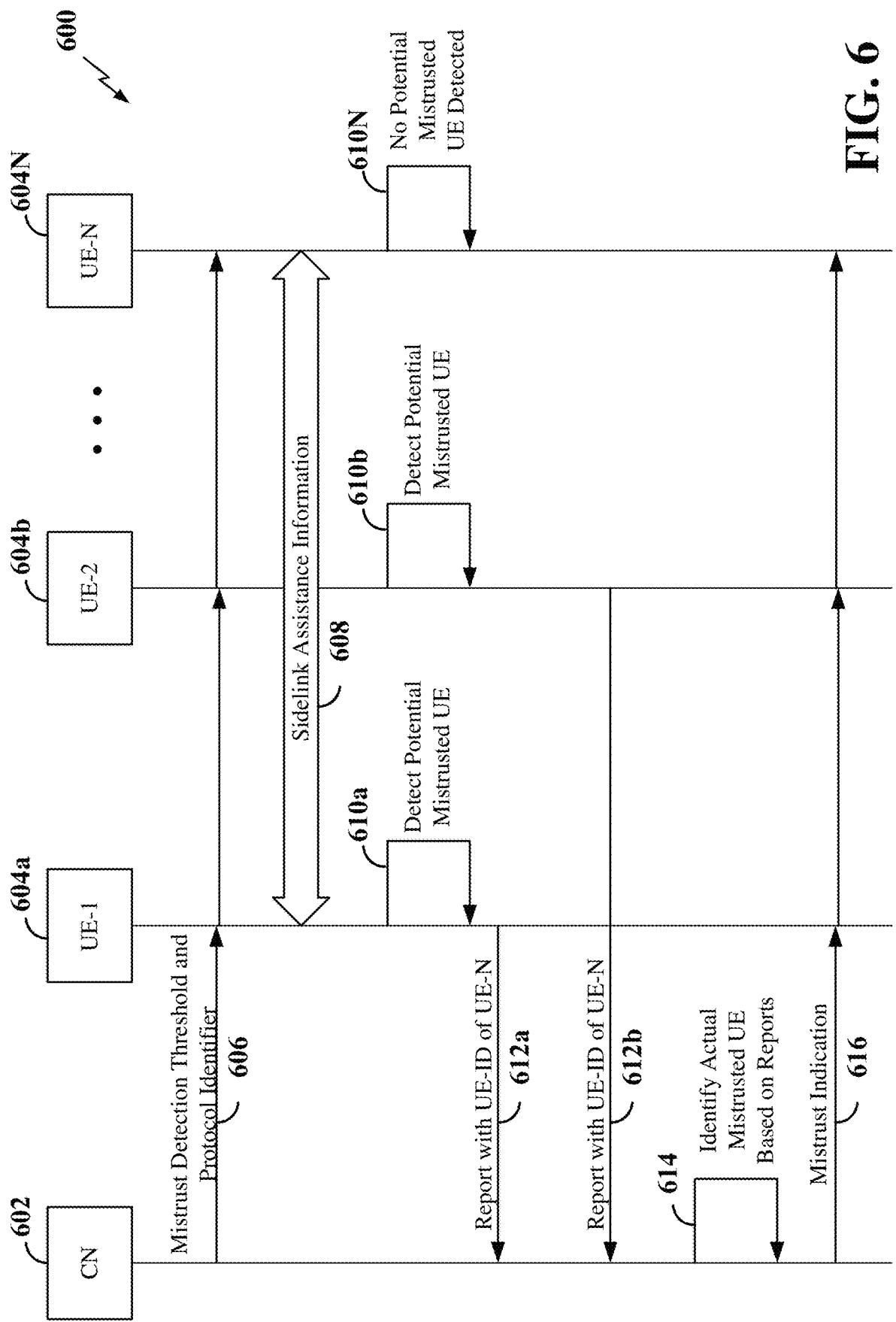
FIG. 6 is a signaling diagram illustrating exemplary signaling for detecting mistrusted UEs in a sidelink network according to some aspects.

FIG. 6 is a signaling diagram illustrating exemplary signaling 600 for detecting mistrusted UEs in a sidelink network according to some aspects. The sidelink network includes a centralized node (CN) 602, such as an RSU or a base station, and a plurality of UEs (e.g., UE-1 604a, UE-2 604b, UE-N 604N). Each of the UEs 604a, 604b, 604N may correspond to any of the UEs or other sidelink devices illustrated in FIGS. 1 and/or 3. In the example shown in FIG. 6, each of the UEs 604a, 604b, . . . , 604N operates in a self-scheduling mode (e.g., Mode 2). In addition, each of the UEs 604a, 604b, 604N may further be in communication with the CN 602.

At 606, the CN 602 can transmit a mistrust detection threshold to each of the UEs 604a, 604b, . . . , 604N. In some examples, the mistrust detection threshold may be an agnostic mistrust detection threshold applicable to all UEs within the geographic zone or area. For example, the agnostic mistrust detection threshold may be x % of resource disagreement with other UEs. In some examples, the mistrust detection threshold may be UE-specific. In this example, the CN 602 may transmit the respective mistrust detection thresholds for each of the plurality of UEs 604a, 604b, . . . , 604N to each of the plurality of UEs 604a, 604b, . . . , 604N. For example, the UE-specific mistrust detection threshold for UE-1 604a may be u % of resource disagreement with other UEs, for UE-2 604b may be v % of resource disagreement with other UEs, and for UE-N 604N may be w % of resource disagreement with other UEs. In some examples, the CN 602 may further transmit a protocol identifier (protocol ID) identifying a selected mistrust protocol of a plurality of mistrust protocols for detecting potential mistrusted UEs.

At 608, the UEs 604a, 604b, . . . , 604N can exchange sidelink assistance information, such as inter-UE coordination information, for a plurality of sidelink resources. For example, each sidelink assistance information can provide information associated with a respective set of sidelink resources. The information may indicate, for example, whether one or more sidelink resources are reserved resources and/or preferred resources. The information may further indicate, for example, whether there is an expected or detected collision on one or more of the sidelink resources.

Based on the received sidelink assistance information, each of the UEs 604a, 604b, . . . , 604N can utilize the selected mistrust protocol and the mistrust detection threshold to determine whether one or more UEs are potential mistrusted UEs. For example, UE-1 604a can identify an amount of the plurality of sidelink resources for which another UE (e.g., UE-N 604N) provides respective inconsistent sidelink assistance information with respect to other UEs (e.g., UE-2 604b and other UEs). For example, the UE-1 604a can identify a portion of the plurality of sidelink resources for which the UE-N 604N provided sidelink assistance information (e.g., inter-UE coordination information). The UE-1 604a can then identify an amount of the portion of the plurality of sidelink resources for which the UE-N 604N provided inconsistent sidelink assistance information with respect to other UEs (e.g., UE-2 604b and/or other UEs). For example, the UE-N 604N may indicate that a particular sidelink resource is reserved, while other UEs may indicate that the particular sidelink resource is preferred (e.g., not reserved).

In some examples, the CN 602 may further transmit a respective weight to be applied to each of the plurality of sidelink resources. In this example, the UE-1 604a may determine the amount of the plurality of sidelink resources (e.g., the amount of the portion of the plurality of sidelink resources) for which the UE-N 604N provided respective inconsistent sidelink assistance information with respect to other UEs based on the respective weight associated with each of the plurality of resources.

The UE-1 604a can then compare the amount of sidelink resources for which the UE-N 604N provided inconsistent sidelink assistance information to the mistrust detection threshold (e.g., the agnostic mistrust detection threshold or the UE-specific mistrust detection threshold for UE-N 604N) to determine whether the UE-N 604N is a potential mistrusted UE. For example, at 610a, the UE-1 604a can detect that the UE-N 604N is a potential mistrusted UE in response to the amount of sidelink resources for which the UE-N 604N provided inconsistent sidelink assistance information to the UE-1 604a exceeding the mistrust detection threshold. Similarly, at 610b, the UE-2 604b can also detect that the UE-N 604N is a potential mistrusted UE in response to the amount of sidelink resources for which the UE-N 604N provided inconsistent sidelink assistance information to the UE-2 604b exceeding the mistrust detection threshold (e.g., the agnostic mistrust detection threshold or the UE-specific mistrust detection threshold for UE-N 604N). At 610c, the UE-N 604N may similarly compare the amount of sidelink resources that each other UE provided inconsistent sidelink assistance information to the mistrust detection threshold (e.g., the agnostic mistrust detection threshold or the respective UE-specific mistrust detection thresholds). In the example shown in FIG. 6, the UE-N may determine that no mistrusted UE is detected.

At 612a and 612b, UE-1 604a and UE-2 604b may each transmit a respective report to the CN 602 indicating that UE-N is a potential mistrusted UE. The report can include an identifier (e.g., UE-ID) of the UE-N. The report may be transmitted, for example, within a PSCCH, a PSSCH, a PUCCH, a PUSCH, a sidelink MAC-CE, a Uu MAC-CE, an RRC message, or other suitable channel or message based on the CN 602 configuration (e.g., an RSU or a gNB). At 614, the CN 602 can utilize the received reports associated with UE-N 604N to identify the UE-N 604N as a mistrusted UE (e.g., an actual mistrusted UE). For example, the CN 602 can identify the UE-N 604N as a mistrusted UE in response to an amount (e.g., number) of received reports for the UE-N 604N exceeding a report threshold.

At 616, the CN 602 can transmit a mistrust indication to each of the plurality of UEs 604a, 604b, . . . , 604N indicating that the UE-N 604N is a mistrusted UE. The mistrust indication may be utilized by each of the UEs 604a, 604b, . . . , 604N−1 to ignore subsequent sidelink assistance information sent by the UE-N 604N. In some examples, the mistrust indication may be a cease transmission indication that instructs the UE-N 604N to cease transmitting subsequent sidelink assistance information.

FIGS. 7A and 7B are diagrams illustrating exemplary sidelink resources 710 for which a plurality of UEs provide sidelink assistance information according to some aspects. In the example shown in FIG. 7A, there are a plurality of UEs (e.g., UE-A 702a, UE-B 702b, UE-C 702c, UE-D 702d, and UE-E 702e) within a geographical zone 700. FIG. 7B illustrates an example of a portion of a resource grid including sidelink resources 710. Each of the sidelink resources 710 may correspond to a minimum resource allocation unit in sidelink (e.g., one sub-channel in the frequency domain and one slot in the time domain).

Each of UE-A 702a, UE-C 702c, UE-D 702d, and UE-E 702e may be within the vicinity of UE-B 702b. For example, each of the UEs 702a, 702c, 702d, and 702e may be within a threshold distance from UE-B 702b or the RSRP of signals received at UE-B 702b from UEs 702a, 702c, 702d, and 702e may be greater than an RSRP threshold. Therefore, UE-B 702*b* may receive sidelink assistance information (SAI) for the sidelink resources 710 from each of the other UEs 702*a*, 702*c*, 702*d*, and 702*e*. In some examples, each of the UEs 702*a*, 702*c*, 702*d*, and 702*e* may provide information on different sets of sidelink resources 710 to the UE-B 702*b*. In the example shown in FIG. 7A, the SAI transmitted from UE-A 702*a* to UE-B 702*b* may provide information on sidelink resources 712 and 714. In addition, the UE-B 702*b* may further receive SAI including information on sidelink resources 712 and 714 from various other UEs 702*c*-702*e*.

The UE-B 702*b* may utilize a mistrust protocol (e.g., which may be selected by a centralized node, such as an RSU or base station, or pre-configured on the UE-B 702*b*) to determine whether UE-A 702*a* may be a potential mistrusted UE. As part of the mistrust protocol, the UE-B 702*b* may assume that the majority of UEs other than UE-A 702*a* (e.g., $A^C$, which is the compliment of A) are not mistrusted UEs. The availability or non-availability of each sidelink resource 710 can then be determined by the majority of the UEs that provide SAI on that sidelink resource. For example, the UE-B 702*b* may consider each sidelink resource 712 and 714 for which UE-A 702*a* provides SAI and compare the SAI provided by UE-A 702*a* to the SAI provided by other UEs (e.g., UEs 702*c*-702*e*) for the same sidelink resources 712 and 714 to identify the inconsistent sidelink resources 714 for which the UE-A 702*a* provided respective inconsistent SAI with respect to the other UEs 702*c*-702*e*. For example, for each of the inconsistent sidelink resources 714, the majority of other UEs 702*c*-702*e* that provided SAI on each of the inconsistent sidelink resources 714 may indicate that the respective sidelink resource is available, whereas the SAI provided by the UE-A 702*a* may indicate that the respective sidelink resource is unavailable.

In an example, the UE-B 702 can determine a portion 718 of the sidelink resources (e.g., corresponding to the combination of sidelink resources 712 and 714) for which UE-A 702*a* provides SAI. The portion 718 includes the sidelink resources 714 for which UE-A 702*a* provides inconsistent SAI with respect to other UEs and the sidelink resources 712 for which UE-A provides consistent SAI with respect to other UEs. The portion 718 does not include other sidelink resources 716 for which the UE-A 702*a* does not provide SAI.

The UE-B 702*b* can then determine an amount of the inconsistent sidelink resources 714. The amount may correspond, for example, to a number of the inconsistent sidelink resources 714 or a percentage of the portion 718 of the sidelink resources that are inconsistent sidelink resources 714. In the example shown in FIG. 7B, the amount may correspond to four sidelink resources or 25% of the portion 718 of the sidelink resources.

The UE-B 702*b* can then compare the amount to a mistrust detection threshold, which may be received from a centralized node (e.g., RSU or base station) or pre-configured on the UE-B 702*b*. In examples in which the amount exceeds the mistrust detection threshold, the UE-B 702*b* may determine that the UE-A 702*a* is a potential mistrusted UE and transmit a report to the centralized node.

Figure 8:
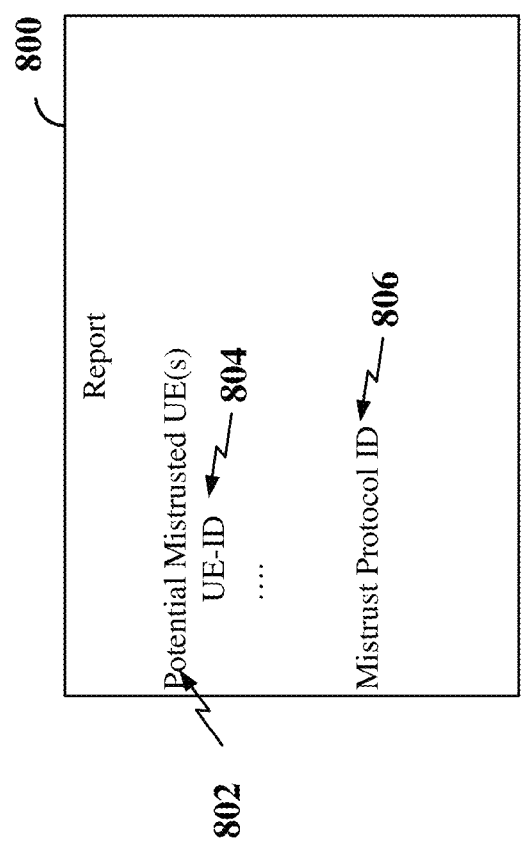
FIG. 8 is a diagram of an example of a report carrying an identifier of a potential mistrusted UE according to some aspects.

FIG. 8 is a diagram illustrating an example of a report 800 carrying an identifier of a potential mistrusted UE according to some aspects. The report 800 may include, for example, a list of one or more identifiers (e.g., UE-IDs) 802 of potential mistrusted UEs detected by the originating UE. The report 800 may further include the mistrust protocol identifier (ID) of the mistrust protocol utilized by the originating UE in detecting the one or more potential mistrusted UEs.

Figure 9:
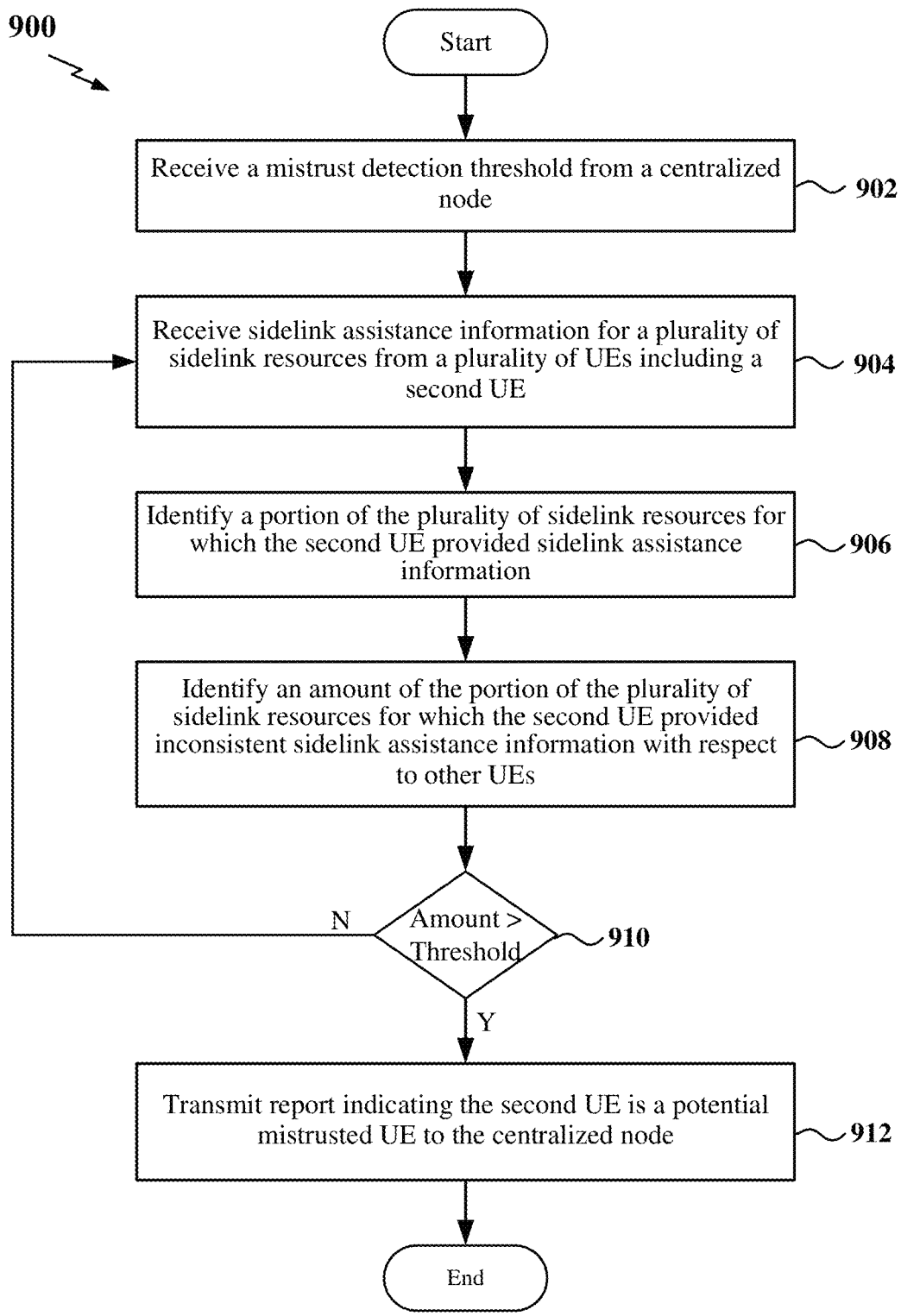
FIG. 9 is a flow chart of an exemplary method for detecting mistrusted UEs according to some aspects.

FIG. 9 is a flow chart of an exemplary method 900 for detecting mistrusted UEs according to some aspects. As described below, some or all illustrated features may be omitted in a particular implementation within the scope of the present disclosure, and some illustrated features may not be required for implementation of all examples. In some examples, the method may be performed by the UE 1300, as described below and illustrated in FIG. 13, by a processor or processing system, or by any suitable means for carrying out the described functions.

Figure 15:
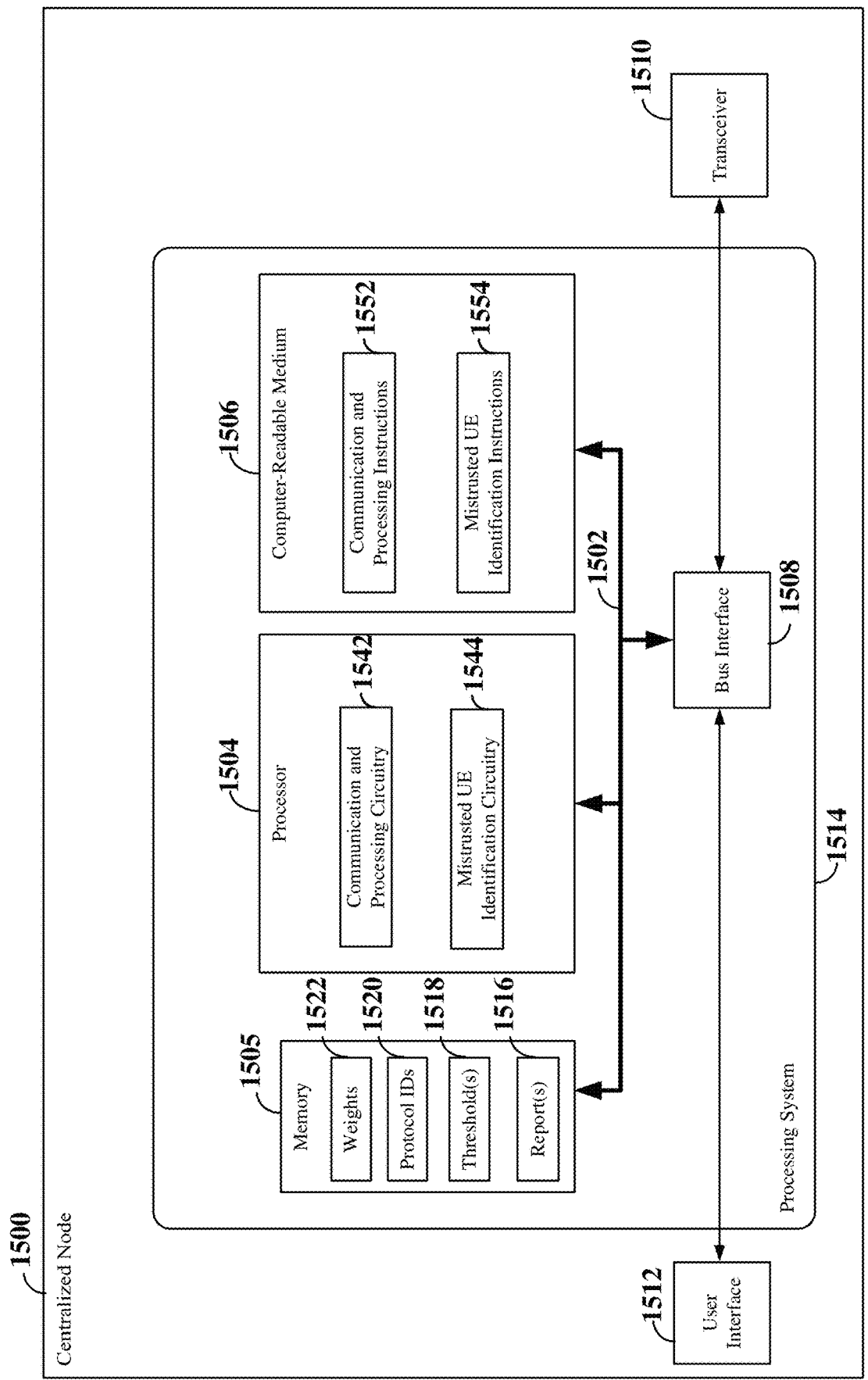
FIG. 15 is a block diagram illustrating an example of a hardware implementation for a centralized node employing a processing system according to some aspects.

At block 902, a UE (e.g., a first UE) may receive a mistrust detection threshold from a centralized node, such as the centralized node 1500 shown in FIG. 15. The centralized node may be, for example, an RSU or a base station (e.g., gNB). For example, the centralized node may correspond to any of the RSUs or base stations shown in any one or more of FIGS. 1 and/or 3. In addition, the first UE may correspond to any of the UEs or other sidelink devices shown in one or more of FIGS. 1 and/or 3. The mistrust detection threshold may be representative of a number of sidelink resources or a percentage of sidelink resources for which a second UE provides inconsistent sidelink assistance information with respect to other UEs.

At block 904, the first UE may receive sidelink assistance information for a plurality of sidelink resources from a plurality of UEs including the second UE. The sidelink assistance information may include, for example, inter-UE coordination information that provides information on the availability or non-availability of sidelink resources. For example, the inter-UE coordination information may indicate sidelink resources that are reserved by a UE and/or preferred (or non-preferred) resources for a UE. Inter-UE coordination information may further indicate an expected or detected collision between transmissions on sidelink resources.

At block 906, the first UE may identify a portion of the plurality of sidelink resources for which the second UE provided sidelink assistance information. At block 908, the first UE may further identify an amount of the portion of the plurality of sidelink resources for which the second UE provided inconsistent sidelink assistance information with respect to other UEs. The amount may correspond to a number of sidelink resources or a percentage of the portion of sidelink resources.

At block 910, the first UE may compare the amount to the mistrust detection threshold to determine whether the amount exceeds the mistrust detection threshold. For example, the first UE may determine whether the number of sidelink resources or the percentage of the portion of sidelink resources for which the second UE provided inconsistent sidelink assistance information exceeds the mistrust detection threshold. If the amount exceeds the mistrust detection threshold (Y branch of block 910), at block 912, the first UE may transmit report indicating the second UE is a potential mistrusted UE to the centralized node.

Figure 10:
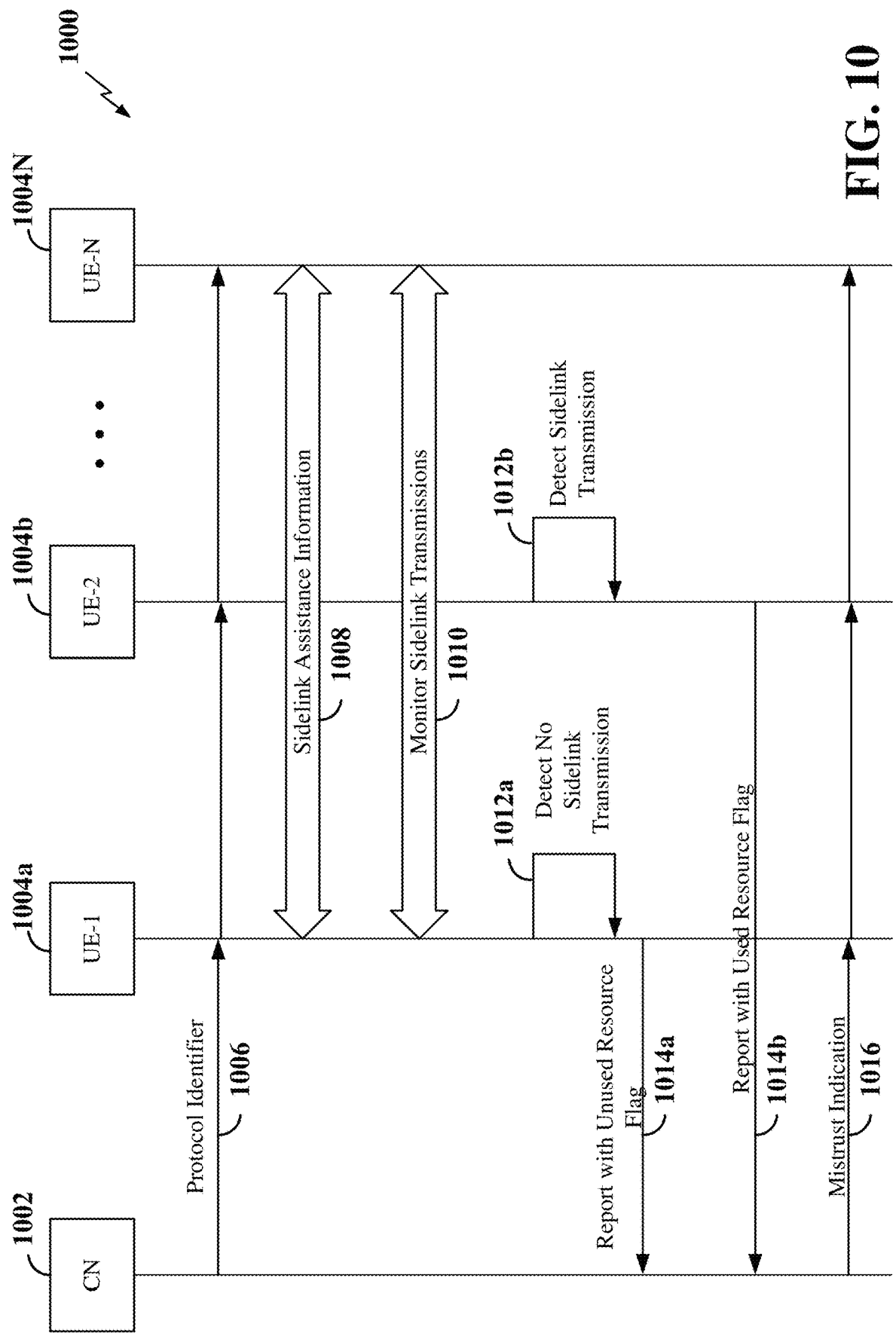
FIG. 10 is a signaling diagram illustrating other exemplary signaling for detecting mistrusted UEs in a sidelink network according to some aspects.

FIG. 10 is a signaling diagram illustrating other exemplary signaling 1000 for detecting mistrusted UEs in a sidelink network according to some aspects. The sidelink network includes a centralized node (CN) 1002, such as an RSU or a base station, and a plurality of UEs (e.g., UE-1 1004*a*, UE-2 1004*b*, . . . , UE-N 1004N). Each of the UEs 1004*a*, 1004*b*, . . . , 1004N may correspond to any of the UEs or other sidelink devices illustrated in FIGS. 1 and/or 3. In the example shown in FIG. 10, each of the UEs 1004*a*, 1004*b*, . . . , 1004N operates in a self-scheduling mode (e.g., Mode 2). In addition, each of the UEs 1004*a*, 1004*b*, . . . , 1004N may further be in communication with the CN 1002.

FIG. 10 illustrates an example of another mistrust protocol that may be utilized to detect mistrusted UEs. In the example shown in FIG. 10, the mistrust protocol is based not only on inconsistent sidelink assistance information, as shown in FIGS. 6-9, but also on verification of sidelink reservations. Thus, the mistrust protocol shown in FIG. 10 includes the features shown in FIGS. 6-9, along with additional features shown in FIG. 10.

At 1006, the CN 1002 can transmit a protocol identifier (protocol ID) identifying a selected mistrust protocol of a plurality of mistrust protocols for detecting potential mistrusted UEs. The CN 1002 can further transmit a mistrust detection threshold to each of the UEs 1004a, 1004b, . . . , 1004N, as shown and described above in connection with FIG. 6.

At 1008, the UEs 1004a, 1004b, . . . , 1004N can exchange sidelink assistance information, such as inter-UE coordination information, for a plurality of sidelink resources. For example, each sidelink assistance information can provide information associated with a respective set of sidelink resources. The sidelink assistance information may indicate the availability or non-availability of each of the sidelink resources. In some examples, one or more of the sidelink assistance information may include a respective resource reservation indicating that one or more respective sidelink resources are reserved for a respective sidelink transmission. For each sidelink assistance information that includes a resource reservation, the sidelink assistance information may further include an accountability trail that identifies a reserving UE that reserved the one or more sidelink resources for the sidelink transmission.

In some examples, the reserving UE may be the UE that transmits the sidelink assistance information including the resource reservation and accountability trail. For example, UE-N 1004N may reserve a first set of one or more sidelink resources for a first sidelink transmission by UE-N 1004N and then transmit sidelink assistance information including the resource reservation and accountability trail indicating that UE-N 1004N reserved the resources for the first sidelink transmission to other UEs (e.g., UE-2 1004b UE-N). In other examples, a different UE (other than the reserving UE) may transmit the sidelink assistance information that includes the resource reservation and accountability trail. For example, UE-1 1004a may receive an SCI-1 from UE-N 1004N reserving a second set of one or more sidelink resources for a second sidelink transmission by UE-N 1004N, and may therefore, include the SCI-1 in the accountability trail of the sidelink assistance information transmitted by UE-1 1004a to other UEs. As another example, UE-1 1004a may receive sidelink assistance information from another UE (e.g., UE-N−1) that includes a resource reservation and accountability trail indicating that UE-N−1 received SCI-1 from UE-N 1004N reserving the second set of one or more sidelink resources, and may therefore, include the sidelink assistance information from UE-N−1 in the accountability trail of the sidelink assistance information transmitted by UE-1 1002a to other UEs.

Based on the accountability trail(s) included in the sidelink assistance information, a UE receiving the sidelink assistance information can trace back a sidelink reservation to the reserving UE that resulted in the one or more sidelink resources being flagged as reserved in one or more received sidelink assistance information. At 1010, each of the UEs 1004a, 1004b, . . . , 1004N can then monitor sidelink transmissions to verify whether the reserving UE(s) actually transmit their respective sidelink transmissions on the respective reserved resources. For example, UE-1 1004a can monitor for the first sidelink transmission by UE-N 1004N on the first of set one or more sidelink resources reserved by UE-N, as indicated in the accountability trail(s) of one or more sidelink assistance information received by UE-1 1004a. As another example, UE-2 1004b can monitor for the second sidelink transmission by UE-N 1004N on the second set of one or more sidelink resources reserved by UE-N 1004N, as indicated in the accountability trail(s) of one or more sidelink assistance information received by UE-2 1004b.

In the example shown in FIG. 10, at 1012a, UE-1 1004a may detect that no sidelink transmission occurred by UE-N 1004N on the first set of one or more sidelink resources reserved by UE-N 1004N for the first sidelink transmission, as indicated in the accountability trail(s) of one or more sidelink assistance information received by UE-1 1004a. In addition, UE-2 1004b may detect that the second sidelink transmission by UE-1 1004a did occur on the second set of one or more sidelink resources reserved by UE-1 1004a, as indicated in the accountability trail(s) of one or more sidelink assistance information received by UE-2 1004b.

At 1014a, UE-1 1004a may then transmit a report to the CN 1002 including a resource usage flag. The resource usage flag may be an unused resource flag indicating that UE-N 1004N failed to transmit the first sidelink transmission on the first set of one or more sidelink resources reserved by the UE-N 1004N. In addition, at 1014b, UE-2 1002b may transmit a report to the CN 1002 including a resource usage flag. The resource usage flag may be a used resource flag indicating that the second sidelink transmission by UE-N 1004N occurred on the second set of one or more sidelink resources reserved by the UE-N 1004N.

Based on the reports received at 1014a and 1014b, together with the reports received at 612a and 612b shown in FIG. 6, the CN 1002 can identify the UE-N 1004N as a mistrusted UE (e.g., an actual mistrusted UE). For example, the CN 602 may take into account whether the reports include used resource flags indicating that the UE-N 1004N transmitted on reserved resources or unused resource flags indicating that the UE-N 1004N failed to transmit on reserved resources. For example, the CN 1002 may exclude reports indicating that the UE-N 1004N transmitted on the reserved resources from the amount of reports compared with the report threshold or may utilize an algorithm based on the content of the reports in determining whether the UE-N 1004N is a mistrusted UE.

At 1016, the CN 1002 can transmit a mistrust indication to each of the plurality of UEs 1004a, 1004b, . . . , 1004N indicating that the UE-N 1004N is a mistrusted UE. The mistrust indication may be utilized by each of the UEs 1004a, 1004b, . . . , 1004N−1 to ignore subsequent sidelink assistance information sent by the UE-N 1004N. In some examples, the mistrust indication may be a cease transmission indication that instructs the UE-N 1004N to cease transmitting subsequent sidelink assistance information.

Figures 11A, 11B:
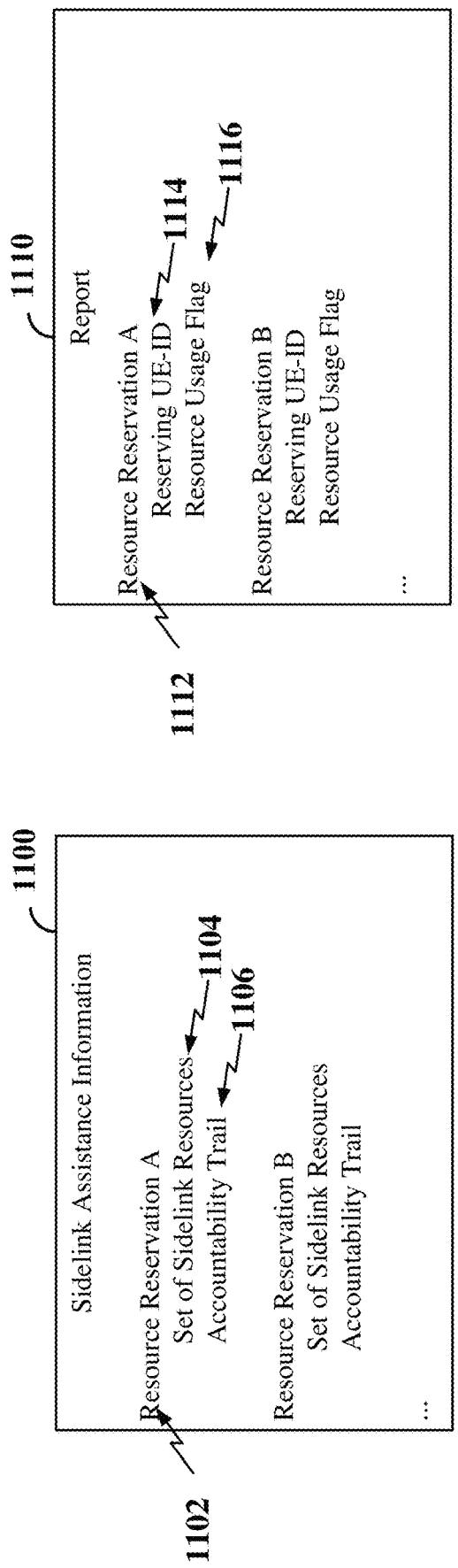
FIG. 11A is a diagram illustrating an example of sidelink assistance information according to some aspects.
FIG. 11B is a diagram illustrating an example of a report carrying a resource usage flag according to some aspects.

FIG. 11A is a diagram illustrating an example of sidelink assistance information 1100 according to some aspects. In some examples, the sidelink assistance information 1100 may correspond to inter-UE coordination information. The sidelink assistance information 1100 may include, for example, a list of resource reservations 1102. Each resource reservation (e.g., Resource Reservation A, Resource Reservation B, . . . ) may include a set of sidelink resources 1104 (e.g., one or more sidelink resources) that are reserved for a sidelink transmission. In addition, each resource reservation 1102 may further include an accountability trail 1106 that indicates the reserving UE that reserved the set of sidelink resources 1104 for the sidelink transmission.

In some examples, the accountability trail 1106 may include an identifier (e.g., UE-ID) of the reserving UE that reserved the resources. In this example, the sidelink assistance information 1100 may be generated and transmitted by the reserving UE. In other examples, the accountability trail 1106 may include both the UE-ID of the reserving UE and an indication that another UE received an SCI-1 from the reserving UE reserving the set of sidelink resources 1104. The accountability trail may further include the UE-ID of the other UE that received the SCI-1 from the reserving UE. In this example, the sidelink assistance information 1100 may be generated and transmitted by the UE that received the SCI-1 from the reserving UE. In other examples, the accountability trail 1106 may include an appended accountability trail appended from another sidelink assistance information received by the UE generating and transmitting the sidelink assistance information 1100. For example, the appended accountability trail may include either the reserving UE-ID or an indication that another UE received an SCI-1 from the reserving UE (along with the UE-IDs of the other UE and the reserving UE). In this example, the accountability trail 1106 may further include an indication that a different UE provided the other sidelink assistance information for the set of sidelink resources 1104 and the UE-ID of the different UE that transmitted the other sidelink assistance information to the UE.

FIG. 11B is a diagram illustrating an example of a report 1110 carrying a resource usage flag according to some aspects. The report 1110 may include, for example, a list of one or more resource reservations 1112. Each resource reservation (e.g., Resource Reservation A, Resource Reservation B, . . . ) 1112 includes a respective UE-ID 1114 of the reserving UE that reserved the sidelink resources for a sidelink transmission. The report 1110 may further include a resource usage flag 1116 for each resource reservation 1112. The resource usage flag 1116 may be a used resource flag indicating that the reserving UE transmitted the sidelink transmission on the reserved resources associated with the corresponding resource reservation 1112 or an unused resource flag indicating that the reserving UE failed to transmit the sidelink transmission on the reserved resources associated with the corresponding resource reservation 1112.

Figure 12:
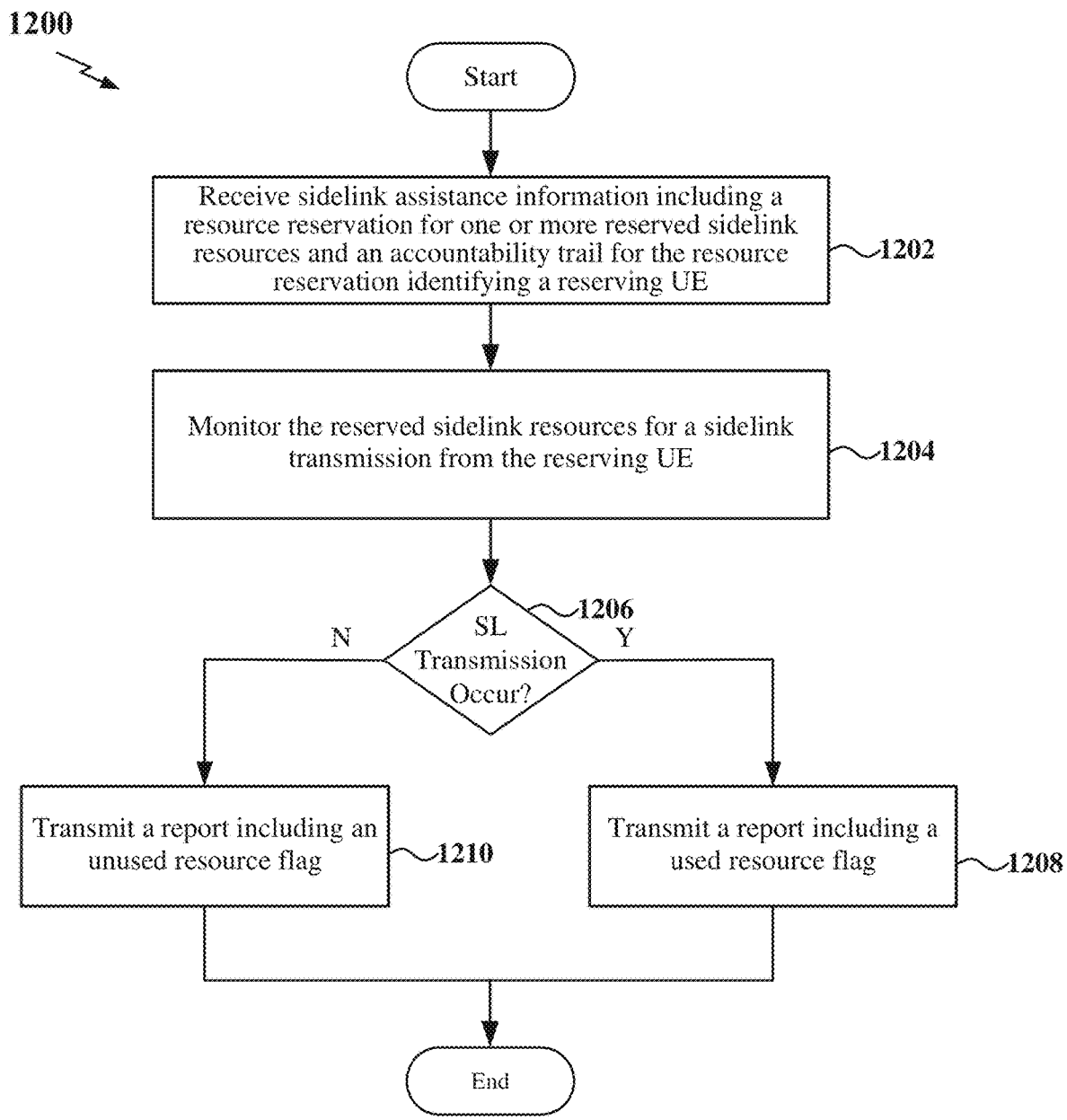
FIG. 12 is a flow chart of another exemplary method for detecting mistrusted UEs according to some aspects.

FIG. 12 is a flow chart of another exemplary method for detecting mistrusted UEs according to some aspects. As described below, some or all illustrated features may be omitted in a particular implementation within the scope of the present disclosure, and some illustrated features may not be required for implementation of all examples. In some examples, the method may be performed by the UE 1300, as described below and illustrated in FIG. 13, by a processor or processing system, or by any suitable means for carrying out the described functions.

At block 1202, a UE (e.g., a first UE) may receive sidelink assistance information including a resource reservation for one or more reserved sidelink resources and an accountability trail for the resource reservation. The accountability trail may identify a reserving UE that reserved the one or more reserved sidelink resources. In some examples, the first UE may receive the sidelink assistance information from the reserving UE or from another UE that received the resource reservation of the reserving UE within either an SCI-1 transmitted by the reserving UE or additional sidelink assistance information. For the latter, the accountability trail may further include information related to the SCI-1 or the additional sidelink assistance information. For example, the accountability trail may include an appended accountability trail from the additional sidelink assistance information.

At block 1204, the first UE may monitor the reserved sidelink resources for a sidelink transmission from the reserving UE. At block 1206, the first UE may determine whether a sidelink transmission by the reserving UE occurred on the one or more reserved sidelink resources. If the sidelink transmission did occur (Y branch of block 1206), at block 1208, the first UE may transmit a report to a centralized node (e.g., a base station or RSU) including a used resource flag indicating that the sidelink transmission by the reserving UE occurred on the one or more reserved sidelink resources. If the sidelink transmission did not occur (N branch of block 1206), at block 1210, the first UE may transmit a report to the centralized node including an unused resource flag indicating that the reserving UE failed to transmit the sidelink transmission on the one or more reserved sidelink resources.

Figure 13:
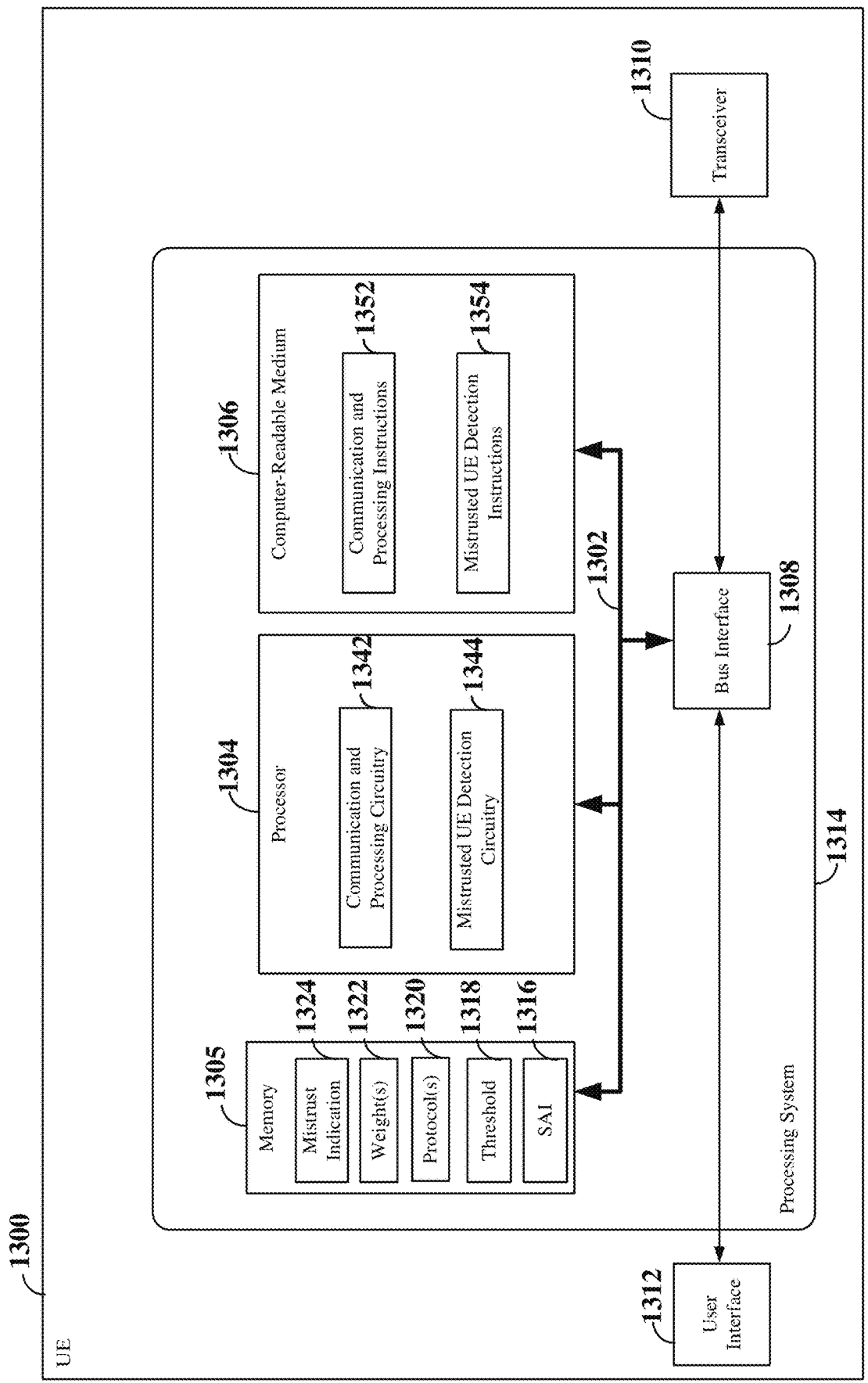
FIG. 13 is a block diagram illustrating an example of a hardware implementation for a UE employing a processing system according to some aspects.

FIG. 13 is a block diagram illustrating an example of a hardware implementation for a UE 1300 employing a processing system 1314. For example, the UE 1300 may correspond to a sidelink device, such as a V2X device, D2D device or other UE or wireless communication device configured for sidelink communication, as shown and described above in reference to FIGS. 1, 3, 5-7, and/or 10.

The UE 1300 may be implemented with a processing system 1314 that includes one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1300 may be configured to perform any one or more of the functions described herein. That is, the processor 1304, as utilized in the UE 1300, may be used to implement any one or more of the processes and procedures described below.

The processor 1304 may in some instances be implemented via a baseband or modem chip and in other implementations, the processor 1304 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 links together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further.

A bus interface 1308 provides an interface between the bus 1302 and a transceiver 1310. The transceiver 1310 provides a communication interface or a means for communicating with various other apparatus over a transmission medium (e.g., air interface). Depending upon the nature of the apparatus, a user interface 1312 (e.g., keypad, display, touch screen, speaker, microphone, control knobs, etc.) may also be provided. Of course, such a user interface 1312 is optional, and may be omitted in some examples.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software. For example, the memory 1305 may store one or more of a plurality of sidelink assistance information (SAI) 1316, a mistrust detection threshold 1318, one or more mistrust protocols 1320, a plurality of weights 1322, and/or a mistrust indication 1324, which may be used by the processor 1304 in generating and/or processing transmissions.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. In some examples, the computer-readable medium 1306 may be part of the memory 1305. Those skilled in the art will recognize how best to implement the described functionality presented throughout this disclosure depending on the particular application and the overall design constraints imposed on the overall system. In some examples, the computer-readable medium 1306 may be implemented on an article of manufacture, which may further include one or more other elements or circuits, such as the processor 1304 and/or memory 1305.

In some aspects of the disclosure, the processor 1304 may include circuitry configured for various functions. For example, the processor 1304 may include communication and processing circuitry 1342, configured to communicate with one or more sidelink devices (e.g., other UEs and/or a network coding device) via respective sidelinks (e.g., PC5 interfaces). In addition, the communication and processing circuitry 1342 may be configured to communicate with a network entity (e.g., a base station, such as a gNB or eNB) via a Uu link. In some examples, the communication and processing circuitry 1342 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1342 may include one or more transmit/receive chains.

In some implementations where the communication involves receiving information, the communication and processing circuitry 1342 may obtain information from a component of the UE 1300 (e.g., from the transceiver 1310 that receives the information via radio frequency signaling or some other type of signaling suitable for the applicable communication medium), process (e.g., decode) the information, and output the processed information. For example, the communication and processing circuitry 1342 may output the information to another component of the processor 1304, to the memory 1305, or to the bus interface 1308. In some examples, the communication and processing circuitry 1342 may receive one or more of signals, messages, other information, or any combination thereof. In some examples, the communication and processing circuitry 1342 may receive information via one or more channels. In some examples, the communication and processing circuitry 1342 may include functionality for a means for receiving. In some examples, the communication and processing circuitry 1342 may include functionality for a means for processing, including a means for demodulating, a means for decoding, etc.

In some implementations where the communication involves sending (e.g., transmitting) information, the communication and processing circuitry 1342 may obtain information (e.g., from another component of the processor 1304, the memory 1305, or the bus interface 1308), process (e.g., modulate, encode, etc.) the information, and output the processed information. For example, the communication and processing circuitry 1342 may output the information to the transceiver 1310 (e.g., that transmits the information via radio frequency signaling or some other type of signaling suitable for the applicable communication medium). In some examples, the communication and processing circuitry 1342 may send one or more of signals, messages, other information, or any combination thereof. In some examples, the communication and processing circuitry 1342 may send information via one or more channels. In some examples, the communication and processing circuitry 1342 may include functionality for a means for sending (e.g., a means for transmitting). In some examples, the communication and processing circuitry 1342 may include functionality for a means for generating, including a means for modulating, a means for encoding, etc.

In some examples, the communication and processing circuitry 1342 may be configured to receive a plurality of sidelink assistance information (SAI) 1316 from a plurality of UEs (e.g., other sidelink devices) via the transceiver 1310. The communication and processing circuitry 1342 may further be configured to store the received SAI 1316 within, for example, memory 1305 for subsequent processing. The communication and processing circuitry 1342 may further be configured to receive a mistrust detection threshold 1318 from a centralized node, such as an RSU or a base station, via the transceiver 1310. In some examples, the mistrust detection threshold 1318 may include a single agnostic mistrust detection threshold associated with a plurality of UEs within a geographic zone. In other examples, the mistrust detection threshold 1318 includes a respective UE-specific mistrust detection threshold for each of the plurality of UEs. The communication and processing circuitry 1342 may further be configured to store the mistrust detection threshold 1318 within, for example, the memory 1305 for subsequent processing. In addition, the communication and processing circuitry 1342 may be configured to receive a protocol identifier from the centralized node via the transceiver 1310. The protocol identifier can identify a selected mistrust protocol of the one or more mistrust protocols 1320 stored in the memory 1305 for use by the UE 1300 in detecting potential mistrusted UEs.

The communication and processing circuitry 1342 may further be configured to receive, via the transceiver 1310, a respective weight to be applied to each of a plurality of sidelink resources in determining whether another UE is a potential mistrusted UE. The communication and processing circuitry 1342 may further be configured to store the plurality of weights 1322 within, for example, the memory 1305 for subsequent processing.

The communication and processing circuitry 1342 may further be configured to transmit a report to the centralized node via the transceiver 1310. The report may indicate that at least one other UE (e.g., at least a second UE) is a potential mistrusted UE. The communication and processing circuitry 1342 may further be configured to transmit an additional report to the centralized node via the transceiver 1310. The additional report may include a resource usage flag indicating whether a sidelink transmission by another UE (e.g., the second UE) occurred or failed to occur on resources reserved by the other UE for the sidelink transmission.

The communication and processing circuitry 1342 may further be configured to receive a mistrust indication 1324 for the second UE from the centralized node via the transceiver 1310. The communication and processing circuitry 1342 may further be configured to store the mistrust indication 1324 within, for example, memory 1305 for subsequent processing. For example, the communication and processing circuitry 1342 may ignore subsequent SAI received from the second UE based on the mistrust indication 1324. The communication and processing circuitry 1342 may further be configured to execute communication and processing instructions (software) 1352 stored in the computer-readable medium 1306 to implement one or more of the functions described herein.

The processor 1304 may further include mistrusted UE detection circuitry 1344, configured to execute a selected mistrust protocol 1320 for use in detecting one or more potential mistrusted UEs communicating over respective sidelinks with the UE 1300. The selected mistrust protocol 1320 may be signaled by the centralized node or pre-configured on the UE 1300. In some examples, the mistrusted UE detection circuitry 1344 may execute the selected mistrust protocol 1320 to identify an amount of a plurality of sidelink resources for which another UE (e.g., the second UE) provided inconsistent sidelink assistance information with respect to other UEs. For example, the mistrusted UE detection circuitry 1344 can identify a portion of the plurality of sidelink resources for which the second UE provided SAI 1316 (e.g., inter-UE coordination information). The mistrusted UE detection circuitry 1344 can then identify an amount of the portion of the plurality of sidelink resources for which the second UE provided inconsistent sidelink assistance information with respect to other UEs. For example, the second UE may indicate that a particular sidelink resource is reserved, while other UEs may indicate that the particular sidelink resource is preferred (e.g., not reserved).

In some examples, the mistrusted UE detection circuitry 1344 may determine the amount of the plurality of sidelink resources (e.g., the amount of the portion of the plurality of sidelink resources) for which the second UE provided respective inconsistent sidelink assistance information with respect to other UEs based on the respective weight 1322 associated with each of the plurality of resources. For example, the mistrusted UE detection circuitry 1344 may apply the respective weight 1322 to each sidelink resource of the portion of the sidelink resources for which the second UE provided SAI 1316 and determine the amount of sidelink resources having inconsistent SAI based on the respective weights.

The mistrusted UE detection circuitry 1344 can then compare the amount of sidelink resources for which the second UE provided inconsistent sidelink assistance information to the mistrust detection threshold 1318 (e.g., the agnostic mistrust detection threshold or the UE-specific mistrust detection threshold for the second UE) to determine whether the second UE is a potential mistrusted UE. For example, the mistrusted UE detection circuitry 1344 can detect that the second UE is a potential mistrusted UE in response to the amount of sidelink resources for which the second UE provided inconsistent sidelink assistance information to the UE 1300 exceeding the mistrust detection threshold 1318. In response to the amount exceeding the mistrust detection threshold 1318, the mistrusted UE detection circuitry 1344 may then generate a report indicating that the second UE is a potential mistrusted UE for transmission to the centralized node via the communication and processing circuitry 1342 and the transceiver 1310.

In some examples, the mistrusted UE detection circuitry 1344 may execute the selected mistrust protocol 1320 to further determine whether one or more sidelink transmissions by a reserving UE (e.g., the second UE and/or another UE) occurred on the sidelink resources reserved by the reserving UE. For example, a given SAI 1316 received by the UE 1300 may include a resource reservation indicating that one or more sidelink resources are reserved for a sidelink transmission by a reserving UE. In this example, the given SAI 1316 may further include an accountability trail that identifies the reserving UE that reserved the one or more sidelink resources for the sidelink transmission. In some examples, the given sidelink assistance information may be generated and transmitted by the reserving UE. In other examples, the given sidelink assistance information may be generated and transmitted by another UE. The mistrusted UE detection circuitry 1344 may be configured to monitor for the sidelink transmission on the reserved sidelink resources and generate a report including a resource usage flag indicating whether or not the sidelink transmission by the reserving UE occurred on the reserved sidelink resources. For example, the mistrusted UE detection circuitry 1344 may be configured to include a used resource flag in the report indicating that the sidelink transmission by the reserving UE occurred on the reserved sidelink resources or an unused resource flag indicating that the reserving UE failed to transmit the sidelink transmission on the reserved sidelink resources. The report may be transmitted to the centralized node via the communication and processing circuitry 1342 and the transceiver 1310.

The mistrusted UE detection circuitry 1344 may further be configured to receive and process the mistrust indication 1324 indicating that the second UE is an actual mistrusted UE from the centralized node. In some examples, the mistrusted UE detection circuitry 1344 may be configured to instruct the communication and processing circuitry 1342 to ignore (e.g., not process and/or store) subsequent SAI received from the second UE. The mistrusted UE detection circuitry 1344 may further be configured to execute mistrusted UE detection instructions (software) 1354 stored in the computer-readable medium 1306 to implement one or more of the functions described herein.

Figure 14:
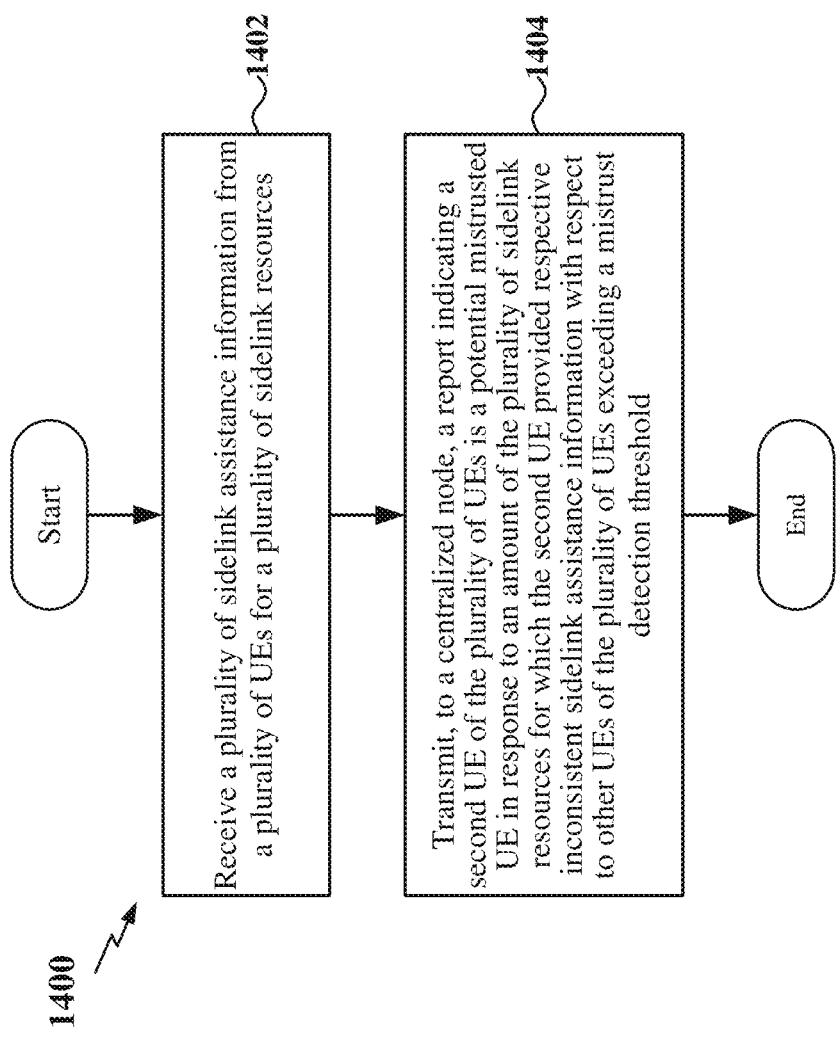
FIG. 14 is a flow chart of an exemplary method for a UE to detect potential mistrusted UEs according to some aspects.

FIG. 14 is a flow chart of an exemplary method 1400 for a UE to detect potential mistrusted UEs according to some aspects. As described below, some or all illustrated features may be omitted in a particular implementation within the scope of the present disclosure, and some illustrated features may not be required for implementation of all examples. In some examples, the method may be performed by the UE 1300, as described above and illustrated in FIG. 13, by a processor or processing system, or by any suitable means for carrying out the described functions.

At block 1402, the UE (e.g., a first UE) may receive a plurality of sidelink assistance information from a plurality of UEs for a plurality of sidelink resources. For example, the communication and processing circuitry 1342 and transceiver 1310, shown and described above in connection with FIG. 13, may provide a means to receive the plurality of sidelink assistance information.

At block 1404, the first UE may transmit, to a centralized node, a report indicating a second UE of the plurality of UEs is a potential mistrusted UE in response to an amount the plurality of sidelink resources for which the second UE provided respective inconsistent sidelink assistance information with respect to other UEs of the plurality of UEs exceeding a mistrust detection threshold. In some examples, the first UE may receive the mistrust detection threshold from the centralized node. The mistrust detection threshold may be a UE-specific mistrust detection threshold associated with the UE or an agnostic mistrust detection threshold associated with the plurality of UEs.

In some examples, the first UE may receive a respective weight to be applied to each of the plurality of resources. In this example, the first UE may determine the amount of the plurality of sidelink resources for which the second UE provided respective inconsistent sidelink assistance information with respect to the other UEs based on the respective weight associated with each of the plurality of resources.

In some examples, the first UE may receive a protocol identifier identifying a selected mistrust protocol of a plurality of mistrust protocols for detecting potential mistrusted UEs. In this example, the first UE may transmit the report based on the selected mistrust protocol. In addition, the first UE may identify the second UE as the potential mistrusted UE utilizing the selected mistrust protocol.

In some examples, a given sidelink assistance information of the plurality of sidelink assistance information received from the second UE or a third UE of the plurality of UEs includes a resource reservation indicating that one or more sidelink resources of the plurality of sidelink resources are reserved. In this example, the given sidelink assistance information further includes an accountability trail identifying a reserving UE of the plurality of UEs that reserved the one or more sidelink resources. In examples in which the reserving UE is the second UE, the first UE may further determine whether a sidelink transmission by the second UE occurred on the one or more sidelink resources of the given sidelink assistance information. The first UE may then transmit an additional report to the centralized node. The additional report can include a used resource flag indicating that the sidelink transmission by the second UE occurred on the one or more sidelink resources or an unused resource flag indicating that the second UE failed to transmit the sidelink transmission on the one or more sidelink resources reserved by the second UE.

In some examples, the first UE may further receive a mistrust indication for the second UE from the centralized node, the mistrust indication indicating that the second UE is an actual mistrusted UE with respect to subsequent sidelink assistance information associated with the second UE. In this example, the first UE may ignore subsequent sidelink assistance information from the second UE based on the mistrust indication. For example, the mistrusted UE detection circuitry 1344, together with the communication and processing circuitry 1342 and transceiver 1310, shown and described above in connection with FIG. 13, may provide a means to transmit the report.

In one configuration, the UE 1300 includes means for receiving a plurality of sidelink assistance information from a plurality of UEs for a plurality of sidelink resources and means for transmitting, to a centralized node, a report indicating a second UE of the plurality of UEs is a potential mistrusted UE in response to an amount of the plurality of sidelink resources for which the second UE provided respective inconsistent sidelink assistance information with respect to other UEs of the plurality of UEs exceeding a mistrust detection threshold. In one aspect, the aforementioned means may be the processor 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1, 3, 5-7, and/or 10, and utilizing, for example, the processes and/or algorithms described herein in relation to FIGS. 6, 9, 10, 12, and 14.

FIG. 15 is a conceptual diagram illustrating an example of a hardware implementation for an exemplary centralized node 1500 employing a processing system 1514. For example, the centralized node 1500 may correspond to an RSU or base station (e.g., a gNB) illustrated in any one or more of FIGS. 1, 3, 5-7, and/or 10.

In accordance with various aspects of the disclosure, an element, or any portion of an element, or any combination of elements may be implemented with a processing system 1514 that includes one or more processors 1504. The processing system 1514 may be substantially the same as the processing system 1314 illustrated in FIG. 13, including a bus interface 1508, a bus 1502, memory 1505, a processor 1504, and a computer-readable medium 1506. For example, the memory 1505 may store one or more reports 1516, one or more thresholds 1518 (e.g., mistrust detection threshold(s) and/or a report threshold), one or more protocol IDs 1520, and a plurality of weights 1522, which may be used by the processor 1504 in generating and/or processing transmissions and/or the reports 1516. Furthermore, the centralized node 1500 may include an optional user interface 1512 and a transceiver 1510 substantially similar to those described above in FIG. 13. The processor 1504, as utilized in a centralized node 1500, may be used to implement any one or more of the processes described below. In some examples, the computer-readable medium 1506 may be implemented on an article of manufacture, which may further include one or more other elements or circuits, such as the processor 1504 and/or memory 1505.

In some aspects of the disclosure, the processor 1504 may include circuitry configured for various functions. For example, the processor 1504 may include communication and processing circuitry 1542, configured to communicate with one or more wireless communication devices (e.g., UEs) via respective sidelinks (e.g., PC5 interfaces) access (e.g., Uu) links. In some examples, the communication and processing circuitry 1542 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1542 may include one or more transmit/receive chains.

In some implementations where the communication involves receiving information, the communication and processing circuitry 1542 may obtain information from a component of the centralized node 1500 (e.g., from the transceiver 1510 that receives the information via radio frequency signaling or some other type of signaling suitable for the applicable communication medium), process (e.g., decode) the information, and output the processed information. For example, the communication and processing circuitry 1542 may output the information to another component of the processor 1504, to the memory 1505, or to the bus interface 1508. In some examples, the communication and processing circuitry 1542 may receive one or more of signals, messages, other information, or any combination thereof. In some examples, the communication and processing circuitry 1542 may receive information via one or more channels. In some examples, the communication and processing circuitry 1542 may include functionality for a means for receiving. In some examples, the communication and processing circuitry 1542 may include functionality for a means for processing, including a means for demodulating, a means for decoding, etc.

In some implementations where the communication involves sending (e.g., transmitting) information, the communication and processing circuitry 1542 may obtain information (e.g., from another component of the processor 1504, the memory 1505, or the bus interface 1508), process (e.g., modulate, encode, etc.) the information, and output the processed information. For example, the communication and processing circuitry 1542 may output the information to the transceiver 1510 (e.g., that transmits the information via radio frequency signaling or some other type of signaling suitable for the applicable communication medium). In some examples, the communication and processing circuitry 1542 may send one or more of signals, messages, other information, or any combination thereof. In some examples, the communication and processing circuitry 1542 may send information via one or more channels. In some examples, the communication and processing circuitry 1542 may include functionality for a means for sending (e.g., a means for transmitting). In some examples, the communication and processing circuitry 1542 may include functionality for a means for generating, including a means for modulating, a means for encoding, etc.

In some examples, the communication and processing circuitry 1542 may be configured to transmit a mistrust detection threshold 1518 to a plurality of UEs via the transceiver 1510. For example, the mistrust detection threshold 1518 may be an agnostic mistrust detection threshold associated with a plurality of UEs within a geographical zone. As another example, the mistrust detection threshold 1518 may include a plurality of UE-specific mistrust detection thresholds. The mistrust detection threshold(s) 1518 may be utilized by the plurality of UEs to detect potential mistrusted UEs that provide inconsistent sidelink assistance information for one or more sidelink resources with respect to other UEs. The communication and processing circuitry 1542 may further transmit a protocol ID 1520 identifying a selected mistrust protocol of a plurality of mistrust protocols for detecting potential mistrusted UEs to one or more of the plurality of UEs via the transceiver. The communication and processing circuitry 1542 may further be configured to transmit, via the transceiver 1510, a respective weight 1522 to be applied to each of a plurality of sidelink resources based on the selected mistrust protocol.

The communication and processing circuitry 1542 may further be configured to receive at least one report 1516 from at least a first UE of the plurality of UEs via the transceiver 1510. The at least one report 1516 may indicate that a second UE of the plurality of UEs is a potential mistrusted UE based on the mistrust detection threshold. In some examples, the at least one report 1516 may be received based on the selected mistrust protocol. The communication and processing circuitry 1542 may further be configured to receive an additional report 1516 via the transceiver 1510. The additional report 1516 may include a resource usage flag indicating whether a sidelink transmission by another UE (e.g., the second UE) occurred or failed to occur on resources reserved by the other UE for the sidelink transmission.

The communication and processing circuitry 1542 may further be configured to transmit a mistrust indication to the plurality of UEs via the transceiver 1510. The mistrust indication can indicate that the second UE is an actual mistrusted UE with respect to subsequent sidelink assistance information associated with the second UE. The communication and processing circuitry 1542 may further be configured to execute communication and processing instructions (software) 1552 stored in the computer-readable medium 1506 to implement one or more of the functions described herein.

The processor 1504 may further include mistrusted UE identification circuitry 1544, configured to determine whether one or more UEs are mistrusted UEs (e.g., actual mistrusted UEs) based on the reports 1516 received from other UEs. In some examples, the mistrusted UE identification circuitry 1544 may determine that the second UE is an actual mistrusted UE in response to an amount (e.g., number) of received reports 1516 for the second UE exceeding a report threshold 1518. The mistrusted UE identification circuitry 1544 may further take into account whether the reports 1516 include used resource flags indicating that the second UE transmitted on reserved resources or unused resource flags indicating that the second UE failed to transmit on reserved resources. For example, the mistrusted UE identification circuitry 1544 may exclude reports 1516 indicating that the second UE transmitted on the reserved resources from the amount of reports compared with the report threshold 1518 or may utilize an algorithm based on the content of the reports 1516 in determining whether the second UE is an actual mistrusted UE.

The mistrusted UE identification circuitry 1544 may further generate the mistrust indication in response to determining that the second UE is an actual mistrusted UE. In some examples, the mistrust indication can include a cease transmission indication that instructs the second UE to cease transmitting the subsequent sidelink assistance information. In other examples, the mistrust indication can indicate to the plurality of UEs to ignore subsequent sidelink assistance information transmitted by the second UE.

In some examples, the mistrusted UE identification circuitry 1544 may further select the mistrust detection threshold(s) 1518 for transmission to the plurality of UEs via the communication and processing circuitry 1542 and the transceiver 1510. In addition, the mistrusted UE identification circuitry 1544 may select the selected mistrust protocol and retrieve the protocol ID 1520 of the selected mistrust protocol for transmission to the plurality of UEs via the communication and processing circuitry 1542 and the transceiver 1510. The mistrusted UE identification circuitry 1544 may further be configured to execute mistrusted UE identification instructions (software) 1554 stored in the computer-readable medium 1506 to implement one or more of the functions described herein.

Figure 16:
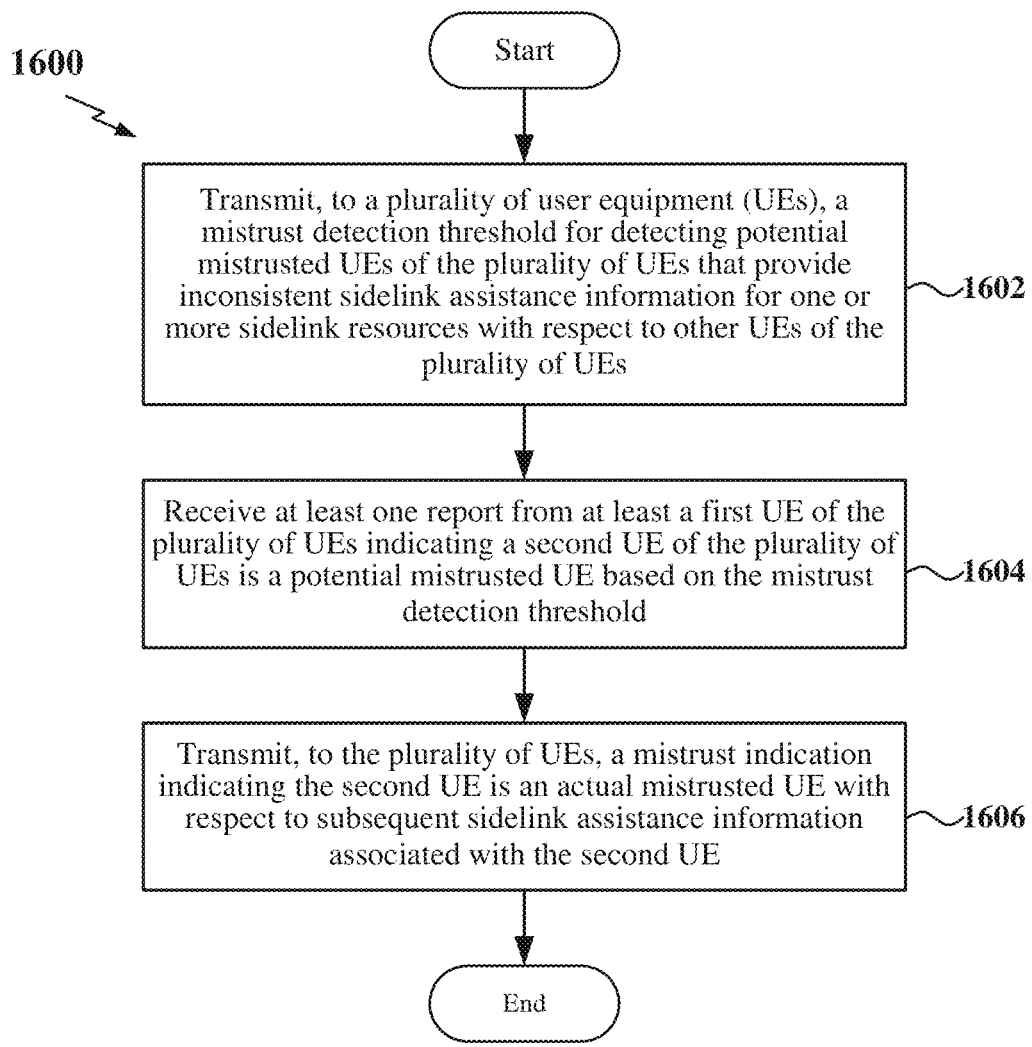
FIG. 16 is a flow chart of an exemplary method for a centralized node to detect mistrusted UEs according to some aspects.

FIG. 16 is a flow chart of an exemplary method 1600 for network coding according to some aspects. As described below, some or all illustrated features may be omitted in a particular implementation within the scope of the present disclosure, and some illustrated features may not be required for implementation of all examples. In some examples, the method may be performed by the centralized node 1500, as described above and illustrated in FIG. 15, by a processor or processing system, or by any suitable means for carrying out the described functions.

At block 1602, the centralized node (e.g., a roadside unit (RSU) or a base station) may transmit, to a plurality of user equipment (UEs), a mistrust detection threshold for detecting potential mistrusted UEs of the plurality of UEs that provide inconsistent sidelink assistance information for one or more sidelink resources with respect to other UEs of the plurality of UEs. In some examples, the mistrust detection threshold is based on a plurality of sidelink resources (e.g., sidelink resource pool) configured for sidelink communication. In some examples, the centralized node may further transmit, to the plurality of UEs, a respective weight to be applied to each of the plurality of resources. In some examples, the centralized node may further transmit a protocol identifier identifying a selected mistrust protocol of a plurality of mistrust protocols for detecting potential mistrusted UEs. For example, the mistrusted UE identification circuitry 1544, together with the communication and processing circuitry 1542 and transceiver 1510 shown and described above in connection with FIG. 15 may provide a means to transmit the mistrust detection threshold.

At block 1604, the centralized node may receive at least one report from at least a first UE of the plurality of UEs indicating a second UE of the plurality of UEs is a potential mistrusted UE based on the mistrust detection threshold. In some examples, the centralized node may receive the at least one report based on the selected mistrust protocol. In some examples, the centralized node may further receive an additional report including a resource usage flag indicating whether a sidelink transmission by the second UE occurred on reserved sidelink resources reserved by the second UE for the sidelink transmission. For example, the communication and processing circuitry 1542 and transceiver 1510, shown and described above in connection with FIG. 15, may provide a means to receive the at least one report.

At block 1606, the centralized node may transmit, to the plurality of UEs, a mistrust indication indicating that the second UE is an actual mistrusted UE with respect to subsequent sidelink assistance information associated with the second UE. In some examples, the mistrust indication includes a cease transmission indication that instructs the second UE to cease transmitting the subsequent sidelink assistance information. In some examples, the centralized node may transmit the mistrust indication in response to an amount of the at least one report exceeding a report threshold. In some examples, the centralized node may determine that the second UE is the mistrusted UE further based on the additional report. For example, the mistrusted UE identification circuitry 1544, together with the communication and processing circuitry 1542 and transceiver 1510, shown and described above in connection with FIG. 15 may provide a means to transmit the mistrust indication.

In one configuration, the centralized node 1500 includes means for transmitting, to a plurality of user equipment (UEs), a mistrust detection threshold for detecting potential mistrusted UEs of the plurality of UEs that provide inconsistent sidelink assistance information for one or more sidelink resources with respect to other UEs of the plurality of UEs, as described in the present disclosure. The centralized node 1500 further includes means for receiving at least one report from at least a first UE of the plurality of UEs indicating a second UE of the plurality of UEs is a potential mistrusted UE based on the mistrust detection threshold and means for transmitting, to the plurality of UEs, a mistrust indication indicating that the second UE is an actual mistrusted UE with respect to subsequent sidelink assistance information associated with the second UE. In one aspect, the aforementioned means may be the processor 1504 shown in FIG. 15 configured to perform the functions recited by the aforementioned means. In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the computer-readable storage medium 1506, or any other suitable apparatus or means described in any one of the FIGS. 1, 3, 6, and/or 10, and utilizing, for example, the processes and/or algorithms described herein in relation to FIG. 16.

The processes shown in FIGS. 9, 12, 14, and 16 may include additional aspects, such as any single aspect or any combination of aspects described below and/or in connection with one or more other processes described elsewhere herein.

Aspect 1: A method for wireless communication at a first user equipment (UE), the method comprising: receiving a plurality of sidelink assistance information from a plurality of UEs for a plurality of sidelink resources; and transmitting, to a centralized node, a report indicating a second UE of the plurality of UEs is a potential mistrusted UE in response to an amount of the plurality of sidelink resources for which the second UE provided respective inconsistent sidelink assistance information with respect to other UEs of the plurality of UEs exceeding a mistrust detection threshold.

Aspect 2: The method of aspect 1, further comprising: receiving a mistrust indication for the second UE from the centralized node, the mistrust indication indicating that the second UE is an actual mistrusted UE; and ignoring subsequent sidelink assistance information from the second UE based on the mistrust indication.

Aspect 3: The method of aspect 1 or 2, further comprising: receiving the mistrust detection threshold from the centralized node.

Aspect 4: The method of aspect 3, wherein the mistrust detection threshold comprises a UE-specific mistrust detection threshold associated with the second UE.

Aspect 5: The method of aspect 3, wherein the mistrust detection threshold comprises an agnostic mistrust detection threshold associated with the plurality of UEs.

Aspect 6: The method of any of aspects 1 through 5, further comprising: receiving a respective weight to be applied to each of the plurality of sidelink resources; and determining the amount of the plurality of sidelink resources for which the second UE provided the respective inconsistent sidelink assistance information with respect to the other UEs based on the respective weight associated with each of the plurality of sidelink resources.

Aspect 7: The method of any of aspects 1 through 6, further comprising: receiving a protocol identifier identifying a selected mistrust protocol of a plurality of mistrust protocols for detecting potential mistrusted UEs.

Aspect 8: The method of aspect 7, wherein the transmitting the report comprises: transmitting the report based on the selected mistrust protocol.

Aspect 9: The method of aspect 8, further comprising: detecting that the second UE is the potential mistrusted UE utilizing the selected mistrust protocol.

Aspect 10: The method of any of aspects 1 through 9, wherein a given sidelink assistance information of the plurality of sidelink assistance information received from the second UE or a third UE of the plurality of UEs comprises a resource reservation indicating that one or more sidelink resources of the plurality of sidelink resources are reserved.

Aspect 11: The method of aspect 10, wherein the given sidelink assistance information further comprises an accountability trail identifying a reserving UE of the plurality of UEs that reserved the one or more sidelink resources.

Aspect 12: The method of aspect 11, wherein the reserving UE comprises the second UE, and further comprising: determining whether a sidelink transmission by the second UE occurred on the one or more sidelink resources of the given sidelink assistance information.

Aspect 13: The method of aspect 12, further comprising: transmitting an additional report to the centralized node, the additional report comprising a used resource flag indicating that the sidelink transmission by the second UE occurred on the one or more sidelink resources.

Aspect 14: The method of aspect 12, further comprising: transmitting an additional report to the centralized node, the additional report comprising an unused resource flag indicating that the second UE failed to transmit the sidelink transmission on the one or more sidelink resources reserved by the second UE.

Aspect 15: A first user equipment (UE) configured for wireless communication comprising a transceiver, a memory, and a processor coupled to the transceiver and the memory, the processor and the memory configured to perform a method of any one of aspects 1 through 14.

Aspect 16: A first user equipment (UE) configured for wireless communication comprising means for performing a method of any one of aspects 1 through 14.

Aspect 17: An article of manufacture comprising a non-transitory computer-readable medium having stored therein instructions executable by one or more processors of a first user equipment (UE) configured for wireless communication to perform a method of any one of examples 1 through 14.

Aspect 18: A method for wireless communication at a centralized node configured for wireless communication, the method comprising: transmitting, to a plurality of user equipment (UEs), a mistrust detection threshold for detecting potential mistrusted UEs of the plurality of UEs that provide inconsistent sidelink assistance information for one or more sidelink resources with respect to other UEs of the plurality of UEs; receiving at least one report from at least a first UE of the plurality of UEs indicating a second UE of the plurality of UEs is a potential mistrusted UE based on the mistrust detection threshold; and transmitting, to the plurality of UEs, a mistrust indication indicating that the second UE is an actual mistrusted UE with respect to subsequent sidelink assistance information associated with the second UE.

Aspect 19: The method of aspect 18, further comprising: transmitting a protocol identifier identifying a selected mistrust protocol of a plurality of mistrust protocols for detecting potential mistrusted UEs.

Aspect 20: The method of aspect 19, wherein the receiving the report comprises: receiving the at least one report based on the selected mistrust protocol.

Aspect 21: The method of any of aspects 18 through 20, wherein the mistrust indication comprises a cease transmission indication that instructs the second UE to cease transmitting the subsequent sidelink assistance information.

Aspect 22: The method of any of aspects 18 through 21, wherein the transmitting the mistrust indication further comprises: transmitting the mistrust indication in response to an amount of the at least one report exceeding a report threshold.

Aspect 23: The method of any of aspects 18 through 22, The method of claim 15, wherein the mistrust detection threshold is based on a plurality of sidelink resources, and further comprising: transmitting, to the plurality of UEs, a respective weight to be applied to each of the plurality of sidelink resources.

Aspect 24: The method of any of aspects 18 through 23, further comprising: receiving an additional report comprising a resource usage flag indicating whether a sidelink transmission by the second UE occurred on reserved sidelink resources reserved by the second UE for the sidelink transmission; and determining that the second UE is the actual mistrusted UE based further on the additional report.

Aspect 25: A centralized node configured for wireless communication comprising a transceiver, a memory, and a processor coupled to the transceiver and the memory, the processor and the memory configured to perform a method of any one of aspects 18 through 24.

Aspect 26: A centralized node configured for wireless communication comprising means for performing a method of any one of aspects 18 through 24.

Aspect 27: An article of manufacture comprising a non-transitory computer-readable medium having stored therein instructions executable by one or more processors of a centralized node configured for wireless communication to perform a method of any one of examples 18 through 24.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3, 6-10, and/or 14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first user equipment (UE) configured for wireless communication, comprising:
   a transceiver;
   a memory; and
   one or more processors coupled to the transceiver and the memory, wherein the one or more processors are configured, individually or collectively, to:
   receive a plurality of sidelink assistance information from a plurality of UEs for a plurality of sidelink resources via the transceiver; and
   transmit, to a centralized node via the transceiver, a report indicating a second UE of the plurality of UEs is a potential mistrusted UE in response to an amount of the plurality of sidelink resources for which the second UE provided respective inconsistent sidelink assistance information with respect to other UEs of the plurality of UEs exceeding a mistrust detection threshold.

2. The first UE of claim 1, wherein the one or more processors are further configured, individually or collectively, to:
   receive a mistrust indication for the second UE from the centralized node, the mistrust indication indicating that the second UE is an actual mistrusted UE; and
   ignore subsequent sidelink assistance information from the second UE based on the mistrust indication.

3. The first UE of claim 1, wherein the one or more processors are further configured, individually or collectively, to:
   receive the mistrust detection threshold from the centralized node.

4. The first UE of claim 3, wherein the mistrust detection threshold comprises a UE-specific mistrust detection threshold associated with the second UE.

5. The first UE of claim 3, wherein the mistrust detection threshold comprises an agnostic mistrust detection threshold associated with the plurality of UEs.

6. The first UE of claim 1, wherein the one or more processors are further configured, individually or collectively, to:
   receive a respective weight to be applied to each of the plurality of sidelink resources; and
   determine the amount of the plurality of sidelink resources for which the second UE provided the respective inconsistent sidelink assistance information with respect to the other UEs based on the respective weight associated with each of the plurality of sidelink resources.

7. The first UE of claim 1, wherein the one or more processors are further configured, individually or collectively, to:
   receive a protocol identifier identifying a selected mistrust protocol of a plurality of mistrust protocols for detecting potential mistrusted UEs.

8. The first UE of claim 7, wherein the one or more processors are further configured, individually or collectively, to:
  transmit the report based on the selected mistrust protocol.

9. The first UE of claim 8, wherein the one or more processors are further configured, individually or collectively, to:
  detect that the second UE is the potential mistrusted UE utilizing the selected mistrust protocol.

10. The first UE of claim 1, wherein a given sidelink assistance information of the plurality of sidelink assistance information received from the second UE or a third UE of the plurality of UEs comprises a resource reservation indicating that one or more sidelink resources of the plurality of sidelink resources are reserved.

11. The first UE of claim 10, wherein the given sidelink assistance information further comprises an accountability trail identifying a reserving UE of the plurality of UEs that reserved the one or more sidelink resources.

12. The first UE of claim 11, wherein the reserving UE comprises the second UE, and wherein the one or more processors are further configured, individually or collectively, to:
  determine whether a sidelink transmission by the second UE occurred on the one or more sidelink resources of the given sidelink assistance information.

13. The first UE of claim 12, wherein the one or more processors are further configured, individually or collectively, to:
  transmit an additional report to the centralized node, the additional report comprising a used resource flag indicating that the sidelink transmission by the second UE occurred on the one or more sidelink resources.

14. The first UE of claim 12, wherein the one or more processors are further configured, individually or collectively, to:
  transmit an additional report to the centralized node, the additional report comprising an unused resource flag indicating that the second UE failed to transmit the sidelink transmission on the one or more sidelink resources reserved by the second UE.

15. A method for wireless communication at a first user equipment (UE), the method comprising:
  receiving a plurality of sidelink assistance information from a plurality of UEs for a plurality of sidelink resources; and
  transmitting, to a centralized node, a report indicating a second UE of the plurality of UEs is a potential mistrusted UE in response to an amount of the plurality of sidelink resources for which the second UE provided respective inconsistent sidelink assistance information with respect to other UEs of the plurality of UEs exceeding a mistrust detection threshold.

16. The method of claim 15, further comprising:
  receiving a mistrust indication for the second UE from the centralized node, the mistrust indication indicating that the second UE is an actual mistrusted UE; and
  ignoring subsequent sidelink assistance information from the second UE based on the mistrust indication.

17. The method of claim 15, further comprising:
  receiving the mistrust detection threshold from the centralized node.

18. The method of claim 15, further comprising:
  receiving a protocol identifier identifying a selected mistrust protocol of a plurality of mistrust protocols for detecting potential mistrusted UEs; and
  detecting that the second UE is the potential mistrusted UE utilizing the selected mistrust protocol, the report being transmitted based on the selected mistrust protocol.

19. The method of claim 15, wherein a given sidelink assistance information of the plurality of sidelink assistance information received from the second UE or a third UE of the plurality of UEs comprises a resource reservation indicating that one or more sidelink resources of the plurality of sidelink resources are reserved, the given sidelink assistance information further comprising an accountability trail identifying a reserving UE of the plurality of UEs that reserved the one or more sidelink resources, and further comprising:
  determining whether a sidelink transmission by the second UE occurred on the one or more sidelink resources of the given sidelink assistance information; and
  transmitting an additional report to the centralized node, the additional report comprising a resource usage flag indicating whether the sidelink transmission by the second UE occurred on the one or more sidelink resources.

20. A centralized node configured for wireless communication, comprising:
  a transceiver;
  a memory; and
  one or more processors coupled to the transceiver and the memory, wherein the one or more processors are configured, individually or collectively, to:
    transmit, to a plurality of user equipment (UEs) via the transceiver, a mistrust detection threshold for detecting potential mistrusted UEs of the plurality of UEs that provide inconsistent sidelink assistance information for one or more sidelink resources with respect to other UEs of the plurality of UEs;
    receive, via the transceiver, at least one report from at least a first UE of the plurality of UEs indicating a second UE of the plurality of UEs is a potential mistrusted UE based on the mistrust detection threshold; and
    transmit, to the plurality of UEs via the transceiver, a mistrust indication indicating that the second UE is an actual mistrusted UE with respect to subsequent sidelink assistance information associated with the second UE.

21. The centralized node of claim 20, wherein the one or more processors are further configured, individually or collectively, to:
  transmit a protocol identifier identifying a selected mistrust protocol of a plurality of mistrust protocols for detecting potential mistrusted UEs.

22. The centralized node of claim 21, wherein the one or more processors are further configured, individually or collectively, to:
  receive the at least one report based on the selected mistrust protocol.

23. The centralized node of claim 20, wherein the mistrust indication comprises a cease transmission indication that instructs the second UE to cease transmitting the subsequent sidelink assistance information.

24. The centralized node of claim 20, wherein the one or more processors are further configured, individually or collectively, to:
  transmit the mistrust indication in response to an amount of the at least one report exceeding a report threshold.

25. The centralized node of claim 20, wherein the mistrust detection threshold is based on a plurality of sidelink resources, and the one or more processors are further configured, individually or collectively, to:
    transmit, to the plurality of UEs, a respective weight to be applied to each of the plurality of sidelink resources.

26. The centralized node of claim 20, wherein the one or more processors are further configured, individually or collectively, to:
    receive an additional report comprising a resource usage flag indicating whether a sidelink transmission by the second UE occurred on reserved sidelink resources reserved by the second UE for the sidelink transmission; and
    determine that the second UE is the actual mistrusted UE based further on the additional report.

27. A method for wireless communication at a centralized node configured for wireless communication, the method comprising:
    transmitting, to a plurality of user equipment (UEs), a mistrust detection threshold for detecting potential mistrusted UEs of the plurality of UEs that provide inconsistent sidelink assistance information for one or more sidelink resources with respect to other UEs of the plurality of UEs;
    receiving at least one report from at least a first UE of the plurality of UEs indicating a second UE of the plurality of UEs is a potential mistrusted UE based on the mistrust detection threshold; and
    transmitting, to the plurality of UEs, a mistrust indication indicating that the second UE is an actual mistrusted UE with respect to subsequent sidelink assistance information associated with the second UE.

28. The method of claim 27, further comprising:
transmitting a protocol identifier identifying a selected mistrust protocol of a plurality of mistrust protocols for detecting potential mistrusted UEs.

29. The method of claim 27, wherein the transmitting the mistrust indication further comprises:
    transmitting the mistrust indication in response to an amount of the at least one report exceeding a report threshold.

30. The method of claim 27, further comprising:
    receiving an additional report comprising a resource usage flag indicating whether a sidelink transmission by the second UE occurred on reserved sidelink resources reserved by the second UE for the sidelink transmission; and
determining that the second UE is the actual mistrusted UE based further on the additional report.

* * * * *

UNITED STATES PATENT AND TRADEMARK OFFICE
CERTIFICATE OF CORRECTION

PATENT NO. : 11,785,467 B2
APPLICATION NO. : 17/511202
DATED : October 10, 2023
INVENTOR(S) : Anantharaman Balasubramanian et al.

It is certified that error appears in the above-identified patent and that said Letters Patent is hereby corrected as shown below:

In the Specification

Column 25, Line 17: the phrase "which is the compliment" is replaced with "which is the complement".

Column 28, Line 2: the phrase "the first of set one" is replaced with "the first set of one".

Column 35, Lines 29-30: the phrase "an amount the plurality of sidelink resources" is replaced with "an amount of the plurality of sidelink resources".

Column 41, Lines 66-67: the phrase "any one of examples 1 through 14" is replaced with "any one of aspects 1 through 14".

Column 42, Line 33: the phrase "The method of claim 15," is deleted.

Column 42, Line 57: the phrase "any one of examples 18 through 24" is replaced with "any one of aspects 18 through 24".

Signed and Sealed this
Thirtieth Day of July, 2024

Katherine Kelly Vidal
*Director of the United States Patent and Trademark Office*